United States Patent
Takenaka et al.

(10) Patent No.: US 8,062,574 B2
(45) Date of Patent: Nov. 22, 2011

(54) PROCESS FOR PRODUCTION OF INJECTION-MOLDED ARTICLE OF POLYLACTIC ACID RESIN

(75) Inventors: Akira Takenaka, Wakayama (JP); Hiroaki Kishimoto, Wakayama (JP); Hirofumi Moriwaka, Wakayama (JP); Haruomi Enomoto, Wakayama (JP)

(73) Assignee: KAO Corporation, Tokyo (JP)

( * ) Notice: Subject to any disclaimer, the term of this patent is extended or adjusted under 35 U.S.C. 154(b) by 0 days.

(21) Appl. No.: 12/677,712

(22) PCT Filed: Sep. 12, 2008

(86) PCT No.: PCT/JP2008/066586
§ 371 (c)(1),
(2), (4) Date: Mar. 11, 2010

(87) PCT Pub. No.: WO2009/035101
PCT Pub. Date: Mar. 19, 2009

(65) Prior Publication Data
US 2010/0201037 A1    Aug. 12, 2010

(30) Foreign Application Priority Data

| | | |
|---|---|---|
| Sep. 12, 2007 | (JP) | 2007-236147 |
| Sep. 12, 2007 | (JP) | 2007-236148 |
| May 26, 2008 | (JP) | 2008-136722 |
| May 26, 2008 | (JP) | 2008-136723 |

(51) Int. Cl.
*B29C 45/00*    (2006.01)
(52) U.S. Cl. .................................. 264/328.17
(58) Field of Classification Search ............... 264/328.17
See application file for complete search history.

(56) References Cited

U.S. PATENT DOCUMENTS

| | | | |
|---|---|---|---|
| 6,294,115 B1 * | 9/2001 | Blizard et al. | 264/45.9 |
| 7,652,085 B2 | 1/2010 | Takenaka et al. | |
| 7,897,092 B2 * | 3/2011 | Shikuma et al. | 264/328.17 |
| 2006/0142505 A1 | 6/2006 | Umemoto et al. | |
| 2007/0270535 A1 | 11/2007 | Yasui et al. | |
| 2007/0299170 A1 | 12/2007 | Ozawa et al. | |
| 2008/0262150 A1 | 10/2008 | Takenaka et al. | |
| 2009/0131601 A1 | 5/2009 | Kabashima et al. | |

FOREIGN PATENT DOCUMENTS

| | | |
|---|---|---|
| EP | 1 746 136 A1 | 1/2007 |
| JP | 2003-236944 A | 8/2003 |
| JP | 2005-272696 A | 10/2005 |
| JP | 2006/89587 A | 4/2006 |
| JP | 2006-176747 A | 7/2006 |
| JP | 2006-206868 A | 8/2006 |
| JP | 2007-191549 A | 8/2007 |
| JP | 2007-269019 A | 10/2007 |
| WO | WO 2005/068554 A1 | 7/2005 |
| WO | WO 2005/097894 A1 | 10/2005 |
| WO | WO 2006/132187 A1 | 12/2006 |

OTHER PUBLICATIONS

Office Action issued on Mar. 17, 2010 in Japanese application No. 2008-235257.
Office Action issued on Mar. 17, 2010 in Japanese application No. 2008-235259.
English Computer translation of JP-2003-236944-A dated Aug. 26, 2003.
English Computer translation of JP-2007-191549-A dated Aug. 2, 2007.
English Computer translation of JP-2007-269019-A dated Oct. 18, 2007.

* cited by examiner

*Primary Examiner* — Jill Heitbrink
(74) *Attorney, Agent, or Firm* — Birch, Stewart, Kolasch & Birch, LLP

(57) ABSTRACT

A method of manufacturing a polylactic acid resin injection molded article, having the step (1): a step of melt-kneading a polylactic acid resin composition containing a polylactic acid resin and a specified organic crystal nucleus agent, while contacting the composition with a supercritical fluid; and step (2): a step of filling the melted product obtained in step (1) in a die to mold with injection-molding. The manufacturing method of the present invention is used as an advantageous technique as compared with the technique of achieving satisfactory moldability by the addition of plasticizer in the field, for example, which requires a polylactic acid resin molded article having high rigidity.

5 Claims, No Drawings

PROCESS FOR PRODUCTION OF INJECTION-MOLDED ARTICLE OF POLYLACTIC ACID RESIN

TECHNICAL FIELD

The present invention relates to a method of manufacturing a polylactic acid resin injection molded article.

BACKGROUND ART

Among the biodegradable resins, the polylactic acid resin is characterized in that it is produced inexpensively due to mass production of L-lactic acid by fermentation method from sugars obtained from corn, potato and the like, that its raw material is a natural crop from which the amount of total carbon oxides discharged is very small, and that the performance of the resulting resin is highly rigid and excellent in transparency, and thus the utilization of the polylactic acid resin is expected at present. However, there is a problem that the polylactic acid resin has such a low crystallization rate that the resin is in an amorphous state after molding so long as a mechanical step such as stretching is not carried out, and that the polylactic acid resin is poor in heat resistance due to the glass transition temperature (Tg) of as low as about 60° C., thus cannot be used under environment in which the temperature is 55° C. or more.

In order to improve heat resistance of a polylactic acid resin, it is important to carry out crystallization upon molding processing, and, for example, a manufacturing method in which a supercritical fluid is used in injection molding to crystallize polylactic acid is proposed (for example, Patent Publication 1). However, even in this method, since crystallization is difficult to proceed because of low crystallization rate, there is a problem that foam formation and deformation occur when the resin is early demolded. In order to prevent it, there has been a problem that the molding time becomes longer, since it is necessary both to set the die retention time longer and to cool the die to the temperature of the glass transition temperature of the resin or lower. In addition, to prevent foam forming in a die due to low crystallization rate, a step in which inside of the die is pressurized with nitrogen gas or the like at a pressure of supercritical pressure or more is indispensably required, so that there has been limitation on equipment and devices. On the other hand, a method of manufacturing a biodegradable resin composition excellent in crystallization rate using a biodegradable resin, a plasticizer, and a crystal nucleus agent which is an aliphatic compound having two or more of at least one group selected from a hydroxyl group and an amide group is proposed (for example, Patent Publication 2). In this method, however, it is a critical requirement to use a plasticizer.
Patent Publication 1: Japanese Patent Laid-Open No. 2003-236944
Patent Publication 2: Japanese Patent Laid-Open No. 2006-176747

SUMMARY OF THE INVENTION

The present invention relates to a method of manufacturing a polylactic acid resin injection molded article having the step (1) and step (2) described below.
step (1): a step of melt-kneading a polylactic acid resin composition while contacting the composition with a supercritical fluid, wherein the composition contains a polylactic acid resin and at least one organic crystal nucleus agent selected from the group consisting of an aliphatic amide compound having at least one hydroxyl group in the molecule, an aliphatic ester compound having at least one hydroxyl group in the molecule, a metal salt of phenylphosphonic acid, a carbohydrazide, a melamine compound, an uracil, an N-substituted urea, and an organic pigment, wherein the organic pigment consists of (a) a cyclic compound having $C=O$ and a functional group selected from NH and O in the molecule, (b) a mixture of a cyclic compound having $C=O$ in the molecule and a cyclic compound having a functional group selected from NH, S and O in the molecule, (c) a phthalocyanine compound which may be substituted and contain a metal, and/or (d) a porphyrin compound which may be substituted.
step (2): a step of filling the melted product obtained in step (1) in a die to mold with injection-molding.

DETAILED DESCRIPTION OF THE INVENTION

The present invention relates to a manufacturing method with which a polylactic acid resin injection molded article having excellent heat resistance can be efficiently obtained with satisfactory moldability without using plasticizer.

The manufacturing method of the present invention can efficiently provides a polylactic acid resin injection molded article having excellent heat resistance in a short molding time without using plasticizer. Further, a satisfactory moldability is exhibited even at lower die temperatures.

[Polylactic Acid Resin Composition]

The polylactic acid resin composition used in the step (1) of the present invention contains a polylactic acid resin and a specified organic crystal nucleus agent described below.

In the present invention, the polylactic acid resin is polylactic acid, or a copolymer of lactic acid and a hydroxycarboxylic acid. The hydroxycarboxyilic acid includes glycolic acid, hydroxybutyric acid, hydroxyvaleric acid, hydroxypentanoic acid, hydroxycaproic acid, hydroxyheptanoic acid and the like, and glycolic acid and hydroxycaproic acid are preferable. The preferred molecular structures of a polylactic acid are those consisting of 80 to 100% by mol of either L- or D-lactic acid unit and 0 to 20% by mol of the corresponding enantiomer of each lactic acid unit. In addition, the copolymer of lactic acid and a hydroxycarboxylic acid consists of 85 to 100% by mol of either L- or D-lactic acid unit and 0 to 15% by mol of a hydroxycarboxylic acid unit. These polylactic acid resins can be obtained by selecting raw materials having a necessary structure from L-lactic acid, D-lactic acid and a hydroxycarboxylic acid, and dehydrating polycondensation of the raw materials. Preferably, the polylactic acid resin can be obtained by selecting those having a necessary structure from a lactide that is a cyclic lactic acid dimer, a glycolide that is a cyclic glycol acid dimer, caprolactone and the like, and carrying out ring-opening polymerization of the raw materials. The lactide includes an L-lactide that is a cyclic L-lactic acid dimer, D-lactide that is a cyclic D-lactic acid dimer, an meso-lactide that is a cyclic dimer of D-lactic acid and L-lactic acid, and a DL-lactide that is a racemic mixture of D-lactide and L-lactide. In the present invention, any lactides can be used. However, the main raw material is preferably D- or L-lactide.

In addition, in the present invention, from the viewpoint of concomitantly satisfying moldability, flexibility and rigidity, as the lactic acid, a stereo complex polylactic acid consisting of two kinds of polylactic acids obtained using lactic acid components of which major components are different isomers. Specifically, two kinds of polylactic acids may be previously melt-kneaded, and the melt-kneaded product as a polylactic acid resin may be subjected to the step (1) of the present invention. Here, polylactic acid alone may be separately melt-kneaded and used, or two kinds of polylactic acids and the raw materials other than the above-mentioned polylactic acid may be combined and concurrently melt-kneaded.

One polylactic acid constituting the stereocomplex polylactic acid [hereinafter described as polylactic acid (A)] contains 90 to 100% by mol of L-form and 0 to 10% by mol of other components including D-form. The other polylactic acid [hereinafter described as polylactic acid (B)] contains 90 to 100% by mol of D-form and 0 to 10% by mol of other components including L-form. Here, the components other than L- and D-form include dicarboxylic acids having functional groups capable of forming two or more ester bonds, polyhydric alcohols, hydroxycarboxylic acids, lactones and the like, and may be a polyester, a polyether, a polycarbonate or the like which has in the molecule two or more unreacted functional groups described above.

The weight ratio of the polylactic acid (A) to the polylactic acid (B) [polylactic acid (A)/polylactic acid (B)] in the stereocomplex polylactic acid is preferably from 10/90 to 90/10, and more preferably from 20/80 to 80/20, from the viewpoint of moldability of the polylactic acid resin composition and satisfying flexibility as well as rigidity and heat resistance.

A commercially available polylactic acid resin includes: Eco Plastic U'z S (trade name) manufactured by TOYOTA MOTOR CORPORATION; LACEA (trade name) manufactured by Mitsui Chemicals, Inc.; Nature works (trade name) manufactured by Cargill Dow Polymers; and the like. Specifically, for example, "LACEA series" (manufactured by Mitsui Chemicals, Inc.) such as LACEA H-100, H-280, H-400 and H-440, "Nature Works" (manufactured by Nature Works) such as 3001D, 3051D, 4032D, 4042D, 6201D, 6251D, 7000D and 7032D, and "Eco Plastic U'z series" (manufactured by TOYOTA MOTOR CORPORATION) such as Eco Plastic U'z S-09, S-12 and S-17. Among them, LACEA H-100, and H-400 (manufactured by Mitsui Chemicals, Inc.), 3001D, 3051D, 4032D, 6201D, 6251D, 7000D, and 7032D (manufactured by Nature Works), Eco Plastic U'z S-09, S-12, and S-17 (manufactured by TOYOTA MOTOR CORPORATION) are preferable, from the viewpoint of the heat resistance of the polylactic acid resin composition.

The polylactic acid resin composition in the present invention may contain another resin besides the above-mentioned polylactic acid resin, from the viewpoint of improvement in the physical properties such as rigidity, flexibility, heat resistance and durability. Specific examples of said another resin includes polyethylenes, polypropylenes, polystyrenes, ABS resins, AS resins, acrylic resins, polyamides, polyphenylene sulfides, polyether ether ketones, polyesters, polyacetals, polysulphones, polyphenylene oxides, polyimides, polyetherimides and the like, or thermoplastic resins such as soft thermoplastic resins such as ethylene/glycidyl methacrylate copolymers, polyester elastomers, polyamide elastomers, ethylene/propylene terpolymers and ethylene/butene-1 copolymers; thermosetting resins such as phenol resins, melamine resins, unsaturated polyester resins, silicone resins and epoxy resins; and the like. Among them, from the viewpoint of compatibility with the polylactic acid resin, a resin having a bond containing a carbonyl group such as an amide bond, an ester bond or a carbonate bond is preferable, since the resin tends to have high affinity to a polylactic acid resin structurally. An example of a preferable resin includes polycarbonates, acrylic resins (PMMA), polyamides and polyesters (polyethylene terephthalates, polybutylene succinates and the like).

In addition, in the present invention, a polymer alloy obtained by blending a polylactic acid and a resin mentioned above can be used as a polylactic acid, from the viewpoint of moldability, satisfying both flexibility and rigidity, heat resistance and abrasion resistance of the polylactic acid resin composition. Specifically, a polylactic acid may be previously melt-kneaded with the above-mentioned resin, and the melt-kneaded product is subjected to the step (1) of the present invention as a polylactic acid resin. Here, those prepared by melt-kneading a polylactic acid and the above-mentioned resin may be used, or a polylactic acid, the above-mentioned resin and other raw materials may be combined and concurrently melt-kneaded.

The blending ratio of the polylactic acid to said another resin (polylactic acid/another resin) is preferably from 95/5 to 20/80, more preferably from 95/5 to 50/50, and even more preferably from 90/10 to 60/40, from the viewpoint of moldability, satisfying both flexibility and rigidity, heat resistance and abrasion resistance of the polylactic acid resin composition.

The content of the polylactic acid resin, that is, the polylactic acid or a copolymer of lactic acid and hydroxycarboxylic acid in all the resins contained in the resin composition is preferably 50% by weight or more, more preferably 80% by weight or more, even more preferably 90% by weight or more, and even more preferably substantially 100% by weight, from the viewpoint of satisfying both strength and flexibility, heat resistance and productivity of the polylactic acid resin composition. Here, the polylactic acid resin as referred herein includes stereocomplex polylactic acids, and polymer alloys obtained by blending a polylactic acid and a resin other than the polylactic acid resin.

The content of the polylactic acid resin in the polylactic acid resin composition is preferably 50% by weight or more, more preferably 60% by weight or more, and even more preferably 70% by weight or more.

In the present invention, the organic crystal nucleus agent includes at least one organic crystal nucleus agent (hereinafter referred to as organic crystal nucleus agent of the present invention) selected from the group consisting of an aliphatic amide compound having at least one hydroxyl group in the molecule, an aliphatic ester compound having at least one hydroxyl group in the molecule, a metal salt of phenylphosphonic acid, a carbohydrazide, a melamine compound, an uracil, an N-substituted urea, and an organic pigment consisting of (a) a cyclic compound having C=O and a functional group selected from NH and O in the molecule, (b) a mixture of a cyclic compound having C=O in the molecule and a cyclic compound having a functional group selected from NH, S and O in the molecule, (c) a phthalocyanine compound which may be substituted and contain a metal, and/or (d) a porphyrin compound which may be substituted.

In the present invention, the organic crystal nucleus agent selected from an aliphatic amide compound having at least one hydroxyl group in the molecule and an aliphatic ester compound having at least one hydroxyl group in the molecule (hereinafter referred to as first organic crystal nucleus agent) is preferably an aliphatic amide compound having two or more hydroxyl groups and two or more amide groups in the molecule or an aliphatic ester compound having two or more hydroxyl groups and two or more ester groups in the molecule, and more preferably an aliphatic amide compound having two or more hydroxyl groups and two or more amide groups in the molecule, from the viewpoint of improving crystallization rate and compatibility of the polylactic acid resin. In addition, the melting point of the first organic crystal nucleus agent is preferably 65° C. or more, more preferably from 70 to 220° C., and even more preferably from 80 to 190°

C., from the viewpoint of improving the dispersibility during kneading of the organic crystal nucleus agent and improving crystallization rate.

Although the reason why the first organic crystal nucleus agent used in the present invention provides satisfactory moldability is not clear, it is thought that the effect is based on the fact that the agent has one or more hydroxyl groups, resulting in satisfactory dispersibility in the polylactic acid resin and the supercritical fluid, and that the agent has one or more amide groups or ester groups, resulting in satisfactory compatibility with the polylactic acid resin composition and the supercritical fluid.

A specific example of the aliphatic amide compound having at least one hydroxyl group in the molecule includes a hydroxyfatty acid monoamide such as 12-hydroxystearic acid monoethanolamide, a hydroxyfatty acid bisamide such as methylenebis-12-hydroxystearic acid amide, ethylenebis-12-hydroxystearic acid amide or hexamethylenebis-12-hydroxystearic acid amide, and the like. A specific example of an aliphatic ester compound having at least one hydroxyl group in the molecule includes a hydroxyfatty acid ester such as 12-hydroxystearic acid triglycelide, and the like.

The first organic crystal nucleus agent is preferably an alkylene-bis-hydroxystearic acid amide such as methylenebis-12-hydroxystearic acid amide, ethylenebis-12-hydroxystearic acid amide or hexamethylenebis-12-hydroxystearic acid amide; a hydroxystearic acid ester such as 12-hydroxystearic acid triglycelide, more preferably ethylenebis-12-hydroxystearic acid amide, hexamethylenebis-12-hydroxystearic acid amide, 12-hydroxystearic acid triglycelide, and even more preferably ethylenebis-12-hydroxystearic acid amide, from the viewpoint of moldability, heat resistance, abrasion resistance and bloom resistance of the polylactic acid resin composition.

In the present invention, when the above-mentioned first organic crystal nucleus agent is contained as an organic crystal nucleus agent, it is preferable that at least one member (hereinafter referred to as second organic crystal nucleus agent) selected from the group consisting of metal salts of aromatic sulfonic acid dialkyls, metal salts of phenylphosphonic acid, metal salts of phosphorous compounds, metal salts of phenolic compounds, metal salts of rosinic acid, aromatic carboxylic acid amides, rosinic amides, carbohydrazides and N-substituted ureas is further contained. In such cases, the ratio of the first organic crystal nucleus agent to the second organic crystal nucleus agent, or the first organic crystal nucleus agent/the second organic crystal nucleus agent (weight ratio), is preferably from 20/80 to 80/20, more preferably from 30/70 to 70/30, and even more preferably from 40/60 to 60/40, from the viewpoint of allowing the effect of the present invention to exhibit.

Among the second organic crystal nucleus agents, a metal salt of phenylphosphonic acid is preferable from the viewpoint of the crystallization rate. The metal salt of phenylphosphonic acid used in the present invention includes a metal salt of phenylsulfonic acid described below.

In the present invention, the metal salt of phenylphosphonic acid used as the organic crystal nucleus agent is a metal salt of phenylphosphonic acid having a phenyl group which may have a substituent and a phosphonic group (—PO(OH)$_2$), wherein the substituent of a phenyl group includes an alkyl group of which carbon number is 1 to 10, an alkoxycarbonyl group wherein an alkoxy group has a carbon number of from 1 to 10, and the like. A specific example of the phenylphosphonic acid includes unsubstituted phenylphosphonic acid, methylphenylphosphonic acid, ethylphenylphosphonic acid, propylphenylphosphonic acid, butylphenylphosphonic acid, dimethoxycarbonylphenylphosphonic acid, diethoxycarbonylphenylphosphonic acid and the like, and unsubstituted phenylphosphonic acid is preferable.

The metal salt of phenylphosphonic acid includes lithium, sodium, magnesium, aluminum, potassium, calcium, barium, copper, zinc, iron, cobalt, nickel salts, and the like, and zinc salts are preferable.

In the present invention, the organic crystal nucleus agent selected from carbohydrazides, melamine compounds, uracils and N-substituted ureas includes carbohydrazides such as ethylenedicarbonyl dibenzoylhydrazide, tetramethylenedicarbonyl dibenzoylhydrazide, hexamethylenedicarbonyl dibenzoylhydrazide, octamethylenedicarbonyl dibenzoylhydrazide, decamethylenedicarbonyl dibenzoylhydrazide, dodecamethylenedicarbonyl dibenzoylhydrazide, cyclohexylenedicarbonyl dibenzoylhydrazide, octamethylenedicarbonyl-di(4-methylbenzoyl)hydrazide, octamethylenedicarbonyl-di(4-t-butylbenzoyl)hydrazide, octamethylenedicarbonyl-di(2-methylbenzoyl)hydrazide, or octamethylenedicarbonyl-di(3-methylbenzoyl)hydrazide; a melamine compound consisting of a salt of at least one melamine and at least one acid, wherein the melamine is selected from melamine, a substituted melamine compound wherein a hydrogen in an amino group of the melamine is substituted with an alkyl group, an alkenyl group or a phenyl group, a substituted melamine compound wherein a hydrogen in an amino group of the melamine is substituted with a hydroxyalkyl group, a hydroxyalkyl(oxaalkyl)n group or an aminoalkyl group, a deammonated condensation product of melamine such as melam, melem, melon or metton, guanamines such as benzoguanamine and acetoguanamine, and the acid is selected from organic acids such as isocyanuric acid, formic acid, acetic acid, oxalic acid, malonic acid, lactic acid, citric acid, benzoic acid, isophthalic acid and terephthalic acid, and inorganic acids such as hydrochloric acid, nitric acid, sulfuric acid, pyrosulfuric acid, methanesulfonic acid, ethanesulfonic acid, p-toluenesulfonic acid, dodecylbenzenesulfonic acid, sulfamates, phosphates, pyrophosphates, polyphosphates, phosphonates, phenylphosphonates, alkylphosphonates, phosphites, borates and tungstates; uracils such as uracil, 6-methyluracil, 5-methyluracil (thymine), 6-azathymine, 6-azauracil, 5-chlorouracil, 6-benzyl-2-thiouracil, 5-cyanouracil, ethyl-2-thiouracil-5-carboxylate, 5-ethyluracil, 5,6-dihydro-6-methyluracil, 5-(hydroxymethyl)uracil, 5-iodouracil, 5-methyl-2-thiouracil, 5-nitrouracil, 5-(trifluoromethyl)uracil, 2-thiouracil and 5-fluorouracil; N-substituted ureas such as xylene-bis-lauryl urea, xylene-bis-myristyl urea, xylene-bis-palmityl urea and xylene-bis-stearyl urea. Here, in the present specification, carbohydrazides do not include a compound such that the carbohydrazide group constitutes a part of the ring; uracils do not include an organic pigment of a cyclic compound selected from the group consisting of 1,4-diketo-2,5-dihydro-3,6-diphenyl-pyrrolo[3,4-c]pyrrole, 1,4-diketo-2,5-dihydro-3,6-di-(p-chlorophenyl)pyrrolo[3,4-c]pyrrole, 1,4-diketo-2,5-dihydro-3,6-di-(p-methylphenyl)pyrrolo[3,4-c]pyrrole, 1,4-diketo-2,5-dihydro-3,6-di-(m-methylphenyl)pyrrolo[3,4-c]pyrrole, 1,4-diketo-2,5-dihydro-3-(p-methylphenyl)-6-(m-methylphenyl)pyrrolo[3,4-c]pyrrole, 1,4-diketo-2,5-dihydro-3,6-di-(p-tert-butylphenyl)pyrrolo[3,4-c]pyrrole, 1,4-diketo-2,5-dihydro-3,6-di-(p-biphenyl)pyrrolo[3,4-c]pyrrole, 1,4-diketo-2,5-dihydro-3,6-di-(m-cyanophenyl)pyrrolo[3,4-c]pyrrole and 1,4-diketo-2,5-dihydro-3,6-di-(m-chlorophenyl)pyrrolo[3,4-c]pyrrole; and N-substituted ureas do not include a compound such that the urea constitutes a part of the ring.

Among these organic crystal nucleus agents, hexamethylenedicarbonyl dibenzoylhydrazide, octamethylenedicarbonyl dibenzoylhydrazide, decamethylenedicarbonyl dibenzoylhydrazide, melamine cyanurate, melamine polyphosphate, melamine-melam-melem polyphosphate double salt, p-toluenesulfonate, uracil, 6-methyluracil and xylene-bis-stearyl urea are preferable, decamethylenedicarbonyl dibenzoylhydrazide, melamine cyanurate, 6-methyluracil and xylene-bis-stearyl urea are more preferable, and decamethylenedicarbonyl dibenzoylhydrazide is still more preferable, from the viewpoint of improving the crystallization rate and efficiently obtaining a molded article excellent in heat resistance.

The organic crystal nucleus agent used in the present invention contains an organic pigment selected from the group consisting of the above-mentioned (a), (b), (c) and (d) (hereinafter referred to as organic pigment of the present invention). The (a) cyclic compound having C=O and a functional group selected from NH and O in the molecule includes a cyclic compound such as 1,4-diketo-2,5-dihydro-3,6-diphenyl-pyrrolo[3,4-c]pyrrole, 1,4-diketo-2,5-dihydro-3,6-di-(p-chlorophenyl)pyrrolo[3,4-c]pyrrole, 1,4-diketo-2,5-dihydro-3,6-di-(p-methylphenyl)pyrrolo[3,4-c]pyrrole, 1,4-diketo-2,5-dihydro-3,6-di-(m-methylphenyl)pyrrolo[3,4-c]pyrrole, 1,4-diketo-2,5-dihydro-3-(p-methylphenyl)-6-(m-methylphenyl)pyrrolo[3,4-c]pyrrole, 1,4-diketo-2,5-dihydro-3,6-di-(p-tert-butylphenyl)pyrrolo[3,4-c]pyrrole, 1,4-diketo-2,5-dihydro-3,6-di-(p-biphenyl)pyrrolo[3,4-c]pyrrole, 1,4-diketo-2,5-dihydro-3,6-di-(m-cyanophenyl)pyrrolo[3,4-c]pyrrole or 1,4-diketo-2,5-dihydro-3,6-di-(m-chlorophenyl)pyrrolo[3,4-c]pyrrole.

The (b) mixture of a cyclic compound having a C=O in the molecule and a cyclic compound having a functional group selected from NH, S and O in the molecule includes indigo, quinacridone and acridone, and derivatives thereof. The derivative of indigo includes a derivative wherein an alkyl group, an alkoxy group or the like is introduced in the indigo skeleton, a derivative wherein a halogen such as chlorine is introduced, thioindigo wherein a sulfur is introduced in the indigo skeleton, and derivatives thereof, and the like.

The (c) phthalocyanine compound which may be substituted and contain a metal includes phthalocyanine compounds which may be substituted and contain a metal such as copper phthalocyanine crystals, titanyl phthalocyanine, aluminum phthalocyanine, vanadium phthalocyanine, cadmium phthalocyanine, antimony phthalocyanine, chrome phthalocyanine, germanium phthalocyanine, iron phthalocyanine, chloroaluminium phthalocyanine, chloroindium phthalocyanine, chlorogallium phthalocyanine, magnesium phthalocyanine, dialkyl phthalocyanine, tetramethyl phthalocyanine, tetraphenyl phthalocyanine, an uranium complex having five isoindole rings (superphthalocyanine) and a boron complex consisting of three isoindole rings, and the like. The substituent thereon includes a halogen such as chlorine, bromine, fluorine and iodine; alkyl groups such as methyl, ethyl and propyl; alkoxy groups such as methoxy and ethoxy; a hydroxyl group or an amino group; and the like.

The (d) porphyrin compound which may be substituted may be any compound so long as the compound contains a porphyrin group, and a chlorophyll compound, a hemin compound, an ester thereof with its carboxyl group esterified or the like can be used. The substituent thereon includes alkyl groups such as methyl, ethyl, n-propyl, isopropyl, n-butyl, isobutyl, sec-butyl, tert-butyl, n-pentyl, isoamyl, tert-amyl, n-hexyl, isohexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-eicosyl, n-docosyl or n-tetracosyl; alkenyl groups such as vinyl, propenyl (1- or 2-), butenyl (1-, 2- or 3-), pentenyl, octenyl or butadienyl (1,3-); alkynyl groups such as ethynyl, propynyl (1- or 2-), butynyl (1-, 2- or 3-), pentynyl, octynyl or decynyl; cycloalkyl groups such as cyclopropyl, cyclobutyl, cyclopentyl, cyclohexyl, cycloheptyl or cyclooctyl; aryl groups, including monocyclic group and fused polycyclic groups, such as a phenyl, biphenylyl, naphthyl, anthryl, phenanthryl and acenaphthylenyl, or bridged cyclic hydrocarbon groups such as 1-adamantyl, 2-adamantyl, 2-norbornanyl and 5-norbornen-2-yl; and the like. A substituent may be further introduced therein to a chemically acceptable extent, and the compound may be, for example, a halide, a sulfonated product, or the like.

A specific example of the organic pigment in the present invention includes PPR2, PR22, PR23, PR48:1, PR48:2, PR48:3, PR48:4, PR62, PR144, PR146, PR147, PR166, PR168, PR184, PR185, PR202, PR205, PR208, PR211, PR213, PR214, PR238, PR242, R253, PR254, PR257, PR272, PR279, PY16, PY17, PY55, PY62, PY79, PY109, PY110, PY155, PY165, PY173, PR185, PY191, PY191:1, PO16, PO34, PO73, PO48, PV32, PB15, PB15:1, PB15:2, PB15:3, PB15:4, PB15:6, PBro23 (wherein P represents Pigment, R represents Red, Y represents Yellow, O represents Orange, V represents Violet, B represents Blue and Bro represents Brown) and Vat Blue 1, as shown in the color index. Among these organic pigments, PR185, PR208, PR254, PR272, PY109, PY110, PV32, PB1, PB15, PB15:3, PB15:6 and Vat Blue 1 are more preferable from the viewpoint of improving the crystallization rate and efficiently obtaining a molded article excellent in heat resistance.

In addition, the organic pigment in the present invention is preferably particles having a volume-based median particle size of 10 μm or less, more preferably 1.0 μm or less, and even more preferably 0.1 μm or less. Here, the volume-based median particle size of the organic pigment is measured with a laser scattering particle size analyzer (manufactured by HORIBA, Ltd., LA-920) by adding distilled water into a measuring cell and measuring the absorbance at a temperature within the appropriate range is attained.

In the present invention, when the above-mentioned organic pigment is contained as an organic crystal nucleus agent, it is preferable that a compound (the above-mentioned first organic crystal nucleus agent) selected from an aliphatic amide compound having at least one hydroxyl group in the molecule and an aliphatic ester compound having at least one hydroxyl group in the molecule is further contained, from the viewpoint of improving the crystallization rate and efficiently obtaining a molded article excellent in heat resistance.

A specific example of the aliphatic amide compound having at least one hydroxyl group in the molecule includes hydroxyfatty acid monoamides such as 12-hydroxystearic acid monoethanolamide; hydroxyfatty acid bismaides such as methylene-bis-12-hydroxystearic acid amide, ethylene-bis-12-hydroxystearic acid amide and hexamethylene-bis-12-hydroxytearic acid amide, and the like. Alkylene-bis-hydroxystearic acid amides such as ethylene-bis-12-hydroxystearic acid amide and hexamethylene-bis-12-hydroxystearic acid amide are preferable, and ethylene-bis-12-hydroxystearic acid amide is more preferable, from the viewpoint of moldability, heat resistance, impact resistance and bloom resistance of the polylactic acid resin composition.

The aliphatic ester compound having at least one hydroxyl group in the molecule includes hydroxyfatty acid esters such as 12-hydroxystearic acid triglyceride, 12-hydroxystearic acid diglyceride, 12-hydroxystearic acid monoglyceride, pentaerythritol-mono-12-hydroxystearate, pentaerythritoldi-12-hydroxystearate and pentaerythritol-tri-12-hydroxystearate. 12-Hydroxystearic acid triglyceride is preferable, from the viewpoint of moldability, heat resistance and impact resistance of the polylactic acid resin composition, and bloom resistance of the crystal nucleus agent.

The organic crystal nucleus agent in the present invention may be used alone or in combination of two or more kinds.

In addition, in the present invention, a known organic crystal nucleus agent other than the above-mentioned organic crystal nucleus agent may be used to an extent that the effect of the present invention is not impaired. The content of the above-mentioned organic crystal nucleus agent in the organic crystal nucleus agent is preferably 80% by weight or more, more preferably 90% by weight or more, and desirably substantially 100% by weight.

The total content of the organic crystal nucleus agent in the polylactic acid resin composition in the present invention is preferably from 0.01 to 5 parts by weight, more preferably from 0.05 to 4 parts by weight, even more preferably from 0.10 to 3 parts by weight, still even more preferably from 0.2 to 3 parts by weight, and still even more preferably from 0.3 to 2 parts by weight, based on 100 parts by weight of the polylactic acid resin, from the viewpoint of improving the crystallization rate and efficiently obtaining a molded article excellent in heat resistance.

Although the polylactic acid resin composition in the present invention can provide satisfactory moldability even if a plasticizer is not contained, the composition can provide more satisfactory crystallization rate by containing a plasticizer, thereby enabling efficient molding.

The plasticizer used in the present invention is not particularly limited, and includes hydroxybenzoates such as 2-ethylhexyl hydroxybenzoate, polyhydric alcohol esters such as an acetate of ethylene oxide adduct of glycerin, phthalates such as di-2-ethylhexyl phthalate, adipates such as dioctyl adipate, maleates such as di-n-butyl maleate, citrates such as tributyl acetylcitrate, alkyl phosphates such as tricrezyl phosphate, an ester of succinic acid and triethylene glycol monomethyl ether, an ester of adipic acid and diethylene glycol monomethyl ether, a tricarboxylic acid ester such as trioctyl trimellitate, polyvalent carboxylic acid alkyl ether esters such as an ester of 1,3,6-hexatricarboxylic acid and butyl diglycol, acetylated polyoxyethylene alkyl (carbon number of the alkyl group: 2 to 15) ethers such as acetylated polyoxyethylene hexyl ether, polyethylene glycol diacetates in which the number of moles of ethylene oxide added is 3 to 20, polyoxyethylene-1,4-butanediol ether diacetate, and the like. Polyhydric alcohol esters such as an acetate of ethylene oxide adduct of glycerin, polyethylene glycol diacetates in which the number of moles of ethylene oxide added is 3 to 10, an ester of succinic acid and triethylene glycol monomethyl ether, an ester of adipic acid and diethylene glycol monomethyl ether, polyvalent carboxylic acid alkyl ether esters such as an ester of 1,3,6-hexatricarboxylic acid and butyl diglycol are preferable, from the viewpoint of excellent flexibility, transparency and crystallization rate of the polylactic acid resin. Acetates of ethylene oxide adduct of glycerin in which the number of moles of ethylene oxide added is 3 to 6, polyethylene glycol diacetates in which the number of moles of ethylene oxide added is 5 to 10, an ester of succinic acid and triethylene glycol monomethyl ether and an ester of adipic acid and diethylene glycol monomethyl ether are more preferable, from the viewpoint of excellent flexibility, transparency, crystallization rate and bloom resistance.

The content of the plasticizer in the polylactic acid resin composition in the present invention is preferably from 1 to 50 parts by weight, and more preferably from 5 to 20 parts by weight, based on 100 parts by weight of the polylactic acid resin, from the viewpoint of flexibility, transparency, crystallization rate and bloom resistance.

Specifically, the ratio of content in the polylactic acid resin composition of the organic crystal nucleus agent to the plasticizer (organic crystal nucleus agent/plasticizer) is preferably from 1/10 to 5/1, and more preferably from 1/2 to 2/1, from the viewpoint of improving the crystallization rate and efficiently obtaining a molded article excellent in heat resistance.

It is preferable that the polylactic acid resin composition in the present invention contains a hydrolysis inhibitor, that is, a blocking agent for reactive terminal carboxyl group, from the viewpoint of durability and heat/humidity resistance. The blocking agent for reactive terminal carboxyl group used in the present invention is not particularly limited so long as the agent is a compound capable of blocking a terminal carboxyl group of the polymer, and those which are used as a blocking agent for a carboxyl terminus of a polymer can be used. In the present invention, such a blocking agent for reactive terminal carboxyl group can block not only a terminus of a polylactic acid resin, but also a carboxyl group of an acidic low-molecular compound generated by pyrolysis, hydrolysis or the like of a polylactic acid resin or natural organic filler. In addition, it is more preferable that the above-mentioned terminus-blocking agent is a compound also capable of blocking a terminal hydroxyl group generated by pyrolysis of an acidic low-molecular compound.

As the blocking agent for reactive terminal carboxyl group described above, it is preferable that at least one compound selected from an epoxy compound, an oxazoline compound, an oxazine compound and a carbodiimide compound is used from the viewpoint of durability and heat/humidity resistance. Among them, an epoxy compound and/or a carbodiimide compound is more preferable.

The carbodiimide compound includes carbodiimide compounds such as aromatic and/or aliphatic polycarbodiimide compounds and monocarbodiimide compounds, and the polycarbodiimide compounds are preferable, from the viewpoint of moldability of the polylactic acid resin composition.

The polycarbodiimide compounds include poly(4,4'-diphenylmethane carbodiimide), poly(4,4'-dicyclohexylmethane carbodiimide), poly(1,3,5-triisopropylbenzene) polycarbodiimide, poly(1,3,5-triisopropylbenzene and 1,5-diisopropylbenzene)polycarbodiimide and the like. The monocarbodiimide compounds include N,N'-di-2,6-diisopropylphenyl carbodiimide and the like.

The above-mentioned carbodiimide compounds can be used alone or in a combination of two or more kinds, in order to satisfy the moldability, heat resistance and impact resistance of the polylactic acid resin composition, and bloom resistance of the organic crystal nucleus agent. In addition, CARBODILITE LA-1 (manufactured by Nisshinbo Holdings Inc.), Stabaxol P and Stabaxol P-100 (manufactured by Rhein Chemie), and Stabaxol 1 and Stabaxol 1-LF (manufactured by Rhein Chemie) can be purchased and used as poly (4,4'-dicyclohexylmethane carbodiimide), poly(1,3,5-triisopropylbenzene)polycarbodiimide and poly(1,3,5-triisopropylbenzene and 1,5-diisopropylbenzene) polycarbodiimide, and N,N'-di-2,6-diisopropylphenyl carbodiimide, respectively.

The content of the hydrolysis inhibitor in the polylactic acid resin composition in the present invention is preferably from 0.05 to 3 parts by weight, and more preferably from 0.1 to 2 parts by weight, based on 100 parts by weight of the polylactic acid resin, from the viewpoint of durability and heat/humidity resistance.

It is preferable that the polylactic acid resin composition in the present invention further contains an inorganic filler, from the viewpoint of improving the physical properties such as rigidity. As the inorganic filler used in the present invention, those fibrous, plate-like, granular or powdery forms which are usually used for reinforcement of a thermoplastic resin can be used. Specifically, the inorganic filler includes fibrous inorganic fillers such as glass fiber, asbestos fiber, carbon fiber, graphite fiber, metallic fiber, potassium titanate whisker, aluminum borate whisker, magnesium-based whisker, silicon-based whisker, wollastonite, sepiolite, asbestos, slag fiber, zonolite, ellestadite, gypsum fiber, silica fiber, silica-aulmina fiber, zirconia fiber, boron nitride fiber, silicon nitride fiber and boron fiber; and plate-like or granular inorganic fillers such as glass flake, non-swellable mica, swellable mica, graphite, metallic foil, ceramic beads, talc, clay, mica, sericite, zeolite, bentonite, modified organo-bentonite, modified organo-montmorillonite, dolomite, kaolin, finely-divided silicate, feldspar powder, potassium titanate, Shirasu balloon, calcium carbonate, magnesium carbonate, barium sulfate, calcium oxide, aluminum oxide, titanium oxide, aluminum silicate, silicon oxide, gypsum, novaculite, dawsonite and white earth. Among these inorganic fillers, carbon fiber, glass fiber, wollastonite, mica, talc and kaolin are preferable. In addition, the aspect ratio of the fibrous filler is preferably 5 or more, more preferably 10 or more, and even more preferably 20 or more.

The above-mentioned inorganic filler may be coated or converged with a thermoplastic resin such as an ethylene/vinyl acetate copolymer or a thermosetting resin such as an epoxy resin, or may be treated with a coupling agent such as aminosilane or epoxysilane. In addition, the amount of the inorganic filler formulated is preferably from 1 to 100 parts by weight, and more preferably from 5 to 50 parts by weight, based on 100 parts by weight of the polylactic acid resin.

The polylactic acid resin composition in the present invention can further contain a high-strength organic synthetic fiber, from the viewpoint of improving the physical properties such as strength, heat resistance and impact resistance. A specific example of the high-strength organic synthetic fiber includes aramid fiber, polyarylate fiber, PBO fiber and the like, and aramid fiber is preferable from the viewpoint of heat resistance.

The polylactic acid resin composition in the present invention can further contain a flame retardant. A specific example of the flame retardant includes halogenated compounds containing bromine or chlorine, antimony compounds such as antimony trioxide, inorganic hydrates (metal hydroxides such as aluminum hydroxide and magnesium hydroxide) and phosphorous compounds, and the like. The inorganic hydrates are preferable from the viewpoint of safety. The flame retardant can be an agent which is surface-treated with a silane coupling agent or the like. The content of the flame retardant is determined with confirming the effect of the flame retardant, and preferably from 30 to 150 parts by weight, more preferably from 50 to 140 parts by weight, and even more preferably from 60 to 130 parts by weight, based on 100 parts by weight of the polylactic acid resin, from the viewpoint of obtaining a satisfactory flame-retardant effect, flow property while processing, strength of the molded article, flexibility of the composition, and inhibition of decrease of heat resistance.

The polylactic acid resin composition in the present invention can further contain, to an extent that the object of the present invention is not impaired, one, or two or more kinds of usual additives, for example, a UV absorbent (a benzophenone-based compound, a benzotriazole-based compound, an aromatic benzoate-based compound, an anilide oxalate-based compound, a cyanoacrylate-based compound and a hindered amine-based compound), a heat stabilizer (a hindered phenol-based compound, a phosphite-based compound, and a thioether-based compound), an antistatic agent, a lubricant, an expanding agent, a releasing agent, a dye, and a coloring agent containing a pigment other than the organic pigment in the present invention.

[Step (1)]

The step (1) of the present invention is a step of melt-kneading a polylactic acid resin composition containing a polylactic acid resin, an organic crystal nucleus agent of the present invention, and additionally, as needed, another component while contacting the composition with a supercritical fluid.

The supercritical fluid is one obtained by compressing a gas in a supercritical state to be liquidized. The supercritical fluid specifically includes carbon dioxide, water, hydrocarbons and the like, and carbon dioxide is preferable. The critical temperature of carbon dioxide is 31.2° C., at which temperature or higher, carbon dioxide is in a supercritical state where the phase transition by pressure does not occur. When a gas in the supercritical state is compressed and the density of the gas is closer to that of the liquid, the solvent power increases, and solubility to a polylactic acid resin composition rapidly rises. Therefore, for practical purposes, carbon dioxide compressed with a pressure of 7 MPa or more is preferable.

In the step (1), the method of melt-kneading a polylactic acid resin composition while contacting the composition with a supercritical fluid includes, for example, a method of melt-kneading a polylactic acid resin composition while introducing the supercritical fluid such as carbon dioxide under the pressure, using an extruder or an injection-molding machine having an inlet port for the supercritical fluid or the like. The supercritical fluid is introduced under the pressure preferably in a proportion of from 0.1 to 10% by weight, and more preferably in a proportion of from 0.5 to 8% by weight relative to the polylactic acid resin composition, from the viewpoint of improving the crystallization rate of the polylactic acid resin composition.

The melt-kneading temperature in the step (1) is preferably 170 to 240° C., and more preferably 170 to 220° C., from the viewpoint of increasing the dispersibility and crystallization rate of the organic crystal nucleus agent and the like of the present invention. The supercritical fluid such as carbon dioxide introduced under the pressure is preferably mechanically kneaded with a polylactic acid resin composition in a melted state, which allows a high concentration of supercritical fluid to uniformly dissolve in the polylactic acid resin composition in a melted state.

[Step (2)]

The step (2) of the present invention is a step of filling the melted product obtained in the step (1) in a die to allow for molding. The polylactic acid resin injection molded article of the present invention is preferably a non-expandable from the viewpoint of maintaining the physical properties. Therefore, the expansion ratio of the polylactic acid resin injection molded article of the present invention is preferably 1.5 times or less, more preferably 1.2 times or less, even more preferably 1.10 times or less, and still even more preferably 1.05 times or less. A method of keeping the expansion ratio of the polylactic acid resin injection molded article of the present invention low is preferably to design the shape of the obtained injection-molded article to be thin-wall, to increase the injection speed, or to previously pressurize the inside the die with a nitrogen gas or the like for the purpose of maintaining the supercritical state of the supercritical fluid, and the pressure inside the die is preferably the critical pressure of the supercritical fluid or higher.

The die temperature in the step (2) is preferably from 10 to 90° C., more preferably from 20 to 85° C., and even more preferably from 50 to 85° C., from the viewpoint of improving the crystallization rate of the polylactic acid resin composition and obtaining a molded article excellent in heat resistance.

The present invention has an especially excellent effect that a polylactic acid resin injection molded article having excellent heat resistance is efficiently obtained in a short molding time without using a plasticizer, and excellent moldability is exhibited even at still lower die temperatures, by contacting a specified polylactic acid resin composition with a supercritical fluid. Although the reason why the especially excellent effect of the present invention is exhibited is not clear, it is thought that effect is provided by the synergistic actions of the organic crystal nucleus agent and the supercritical fluid contained in the specified polylactic acid resin composition.

EXAMPLES

Synthesis Example 1-1 of Polylactic Acid Resin Composition

As polylactic acid resin compositions, the raw materials of the products (1-A to 1-E) of the present invention and the comparative product (1-a) shown in Table 1 were melt-kneaded at 190° C. in a twin screw extruder (PCM-45, manufactured by IKEGAI, Ltd.) and strand cut, to give pellets of the polylactic acid resin compositions. The resultant pellets were dried at 70° C. under reduced pressure for one day to a water content of 500 ppm or less.

[Table 1]

TABLE 1

| Polylactic Acid Resin Composition [Ratio of Content (Weight Ratio)] |  |
|---|---|
| Products of the Present Invention | |
| 1-A | U'z S-12*[1]/OHC18EB*[4]/MCI*[8] = 100/0.5/1 |
| 1-B | U'z S-12*[1]/OHC18EB*[4]/PPA-Zn*[6]/MCI*[8] = 100/0.5/0.5/1 |
| 1-C | U'z S-12*[1]/OHC18EB*[4]/PPA-Zn*[6]/(MeEO3)2SA*[7]/MCI*[8] = 100/0.5/0.5/10/1 |
| 1-D | U'z S-17*[2]/OHC18Gly*[5]/(MeEO3)2SA*[7]/Talc*[10]/PCI*[9] = 100/1/12.5/20/1 |
| 1-E | LACEA H-400*[3]/OHC18EB*[4]/PPA-Zn*[6]/(MeEO3)2SA*[7]/Al(OH)3*[12]/Glass Fiber*[11]/MCI*[8] = 100/0.5/0.5/5/120/12/1 |
| Comparative Product | |
| 1-a | U'z S-12*[1]/MCI*[8] = 100/1 |

Here, the raw materials in Table 1 represent as follows.
<Polylactic Acid Resin>
  *1: Polylactic acid resin (Eco Plastic U'zS-12, manufactured by TOYOTA MOTOR CORPORATION)
    (Optical purity: 99.6%, weight-average molecular weight: 112,000, residual monomer: 173 ppm)
  *2: Polylactic acid resin (Eco Plastic U'zS-17, manufactured by TOYOTA MOTOR CORPORATION)
    (Optical purity: 99.7%, weight-average molecular weight: 110,000, residual monomer: 327 ppm)
  *3: Polylactic acid resin (LACEA H-400, manufactured by Mitsui Chemicals, Inc.)
    (Optical purity: 98.5%, weight-average molecular weight: 142,000, residual monomer: 1,200 ppm)
<First Organic Crystal Nucleus Agent>
  *4: Ethylenebis-12-hydroxystearic acid amide (SLIPAX H, manufactured by Nippon Kasei Chemical Co., Ltd.)
  *5: 12-hydroxystearic acid triglyceride (KAOWAX 85P, manufactured by Kao Corporation)
<Second Organic Crystal Nucleus Agent>
  *6: Zinc salt of non-substituted phenylphosphonic acid (product number: PPA-Zn, manufactured by NISSAN CHEMICAL INDUSTRIES, LTD.)
<Plasticizer>
  *7: Diester of succinic acid and triethylene glycol monomethyl ether obtained in Synthesis Example 1-1 of Plasticizer described below
<Hydrolysis Inhibitor>
  *8: Stabaxol 1-LF (manufactured by Rhein Chemie Japan)
  *9: CARBODILITE LA-1 (manufactured by Nisshinbo Chemical, Inc.)
<Inorganic Filler>
  *10: Talc (MicroAce P-6, manufactured by Nippon Talc Co., Ltd.)
  *11: Glass fiber (ECS03T-187, manufactured by Nippon Electric Glass Co., Ltd.)
<Flame Retardant>
  *12: Aluminum hydroxide (BT703ST, Nippon Light Metal Co., Ltd.)

Synthesis Example 1-1 of Plasticizer

In a 3-L flask equipped with a stirrer, a thermometer and a dehydration tube, 500 g of succinic anhydride, 2,463 g of triethylene glycol monomethyl ether and 9.5 g of paratoluenesulfonic acid monohydrate were charged, and the mixture was reacted under reduced pressure of 4 to 10.7 kPa at 110° C. for 15 hours, while blowing nitrogen (500 mL/minute) into the space. The acid value of the reaction solution was 1.6 (KOH mg/g). To the reaction solution, 27 g of an adsorbent Kyoward 500SH (manufactured by Kyowa Chemical Industry Co., Ltd.) was added, stirred at 80° C. at 2.7 kPa for 45 minutes, and filtered. Thereafter, triethylene glycol monomethyl ether was distilled off at a liquid temperature of 115 to 200° C. at a pressure of 0.03 kPa. After cooling to 80° C., the residual liquid was filtered under reduced pressure, to give a diester of succinic acid and triethylene glycol monomethyl ether as a filtrate. The resultant diester had an acid value of 0.2 (KOH mg/g), a saponification value of 276 (KOH mg/g), a hydroxyl value of 1 or less (KOH mg/g) and a hue of APHA200.

Examples 1-1 to 1-5 and Comparative Example 1-1

The pellets of the polylactic acid resin compositions (the products 1-A to 1-E of the present invention and the comparative product 1-a) obtained in Synthesis Example 1-1 were supplied into an injection molding machine (Mucell 85 ton, manufactured by The Japan Steel Works, Ltd.) set at a cylinder temperature of 200° C. for melting, while a supercritical fluid (carbon dioxide in a supercritical state) pressurized to 8 MPa was introduced through the gas inlet port provided at the cylinder section of the injection molding machine in the concentration shown in Table 2. The supercritical fluid was brought into contact with the polylactic acid resin composition in a melted state by kneading with the screw. The temperature inside the die attached to the tip of the injection molding machine was maintained at the temperature shown in Table 2, and the melted polylactic acid resin composition in contact with the carbon dioxide in a supercritical state was molded with injection-molding in this die at an injection pressure required for the molding as shown in Table 2, and retained therein until the crystallization was completed, to obtain a test piece (150 mm×30 mm×1 mm in thickness). The die retention time required for the release of the resultant test piece was evaluated by the following criteria. The results are shown in Table 2.

<Evaluation Criteria for Die Retention Time Required for Releasing>

The time taken to be decided that each test piece was not deformed and was easily taken out under the molding conditions shown in Table 2 was defined as the die retention time required for the release. Here, the higher the rates of melt crystallization of the test piece inside the die and at the runner part, the shorter the die retention time required for the release.

Comparative Examples 1-2 and 1-3

In the same manner as in Example 1-1, except that the pellets of the polylactic acid resin compositions (the products 1-A and 1-B of the present invention) obtained in Synthesis Example 1-1 were used, carbon dioxide in a supercritical state was not introduced under the pressure, and the injection molding was performed at the die temperature shown in Table 2 at an injection pressure required for the molding as shown in Table 2, a test piece was obtained and the die retention time required for the release was evaluated in the same manner. The results are shown in Table 2.

[Table 2]

cal fluid into contact with the polylactic acid resin composition during the melt-kneading.

Examples 1-6 to 1-8

In the same manner as in Example 1-1, except that the pellets of the polylactic acid resin compositions (the products 1-B to 1-D of the present invention) obtained in Synthesis Example 1-1 were used, and the die temperatures, the supercritical carbon dioxide concentrations and the die retention times shown in Table 3 were employed, the injection molding was performed. With respect to the resultant test pieces [a flat plate (70 mm×40 mm×3 mm) and a prism-shaped specimen (125 mm×12 mm×6 mm)], the bending test and thermal deformation temperature were evaluated by the following methods for the prism-shaped specimen (125 mm×12 mm×6 mm), while the relative crystallinity, bleeding resistance and expansion ratio were evaluated by the following methods for the flat plate (70 mm×40 mm×3 mm). The results are shown in Table 3.

<Criteria for Evaluation of Die Releasability>

○: Very easily releasable (the test piece is not deformed and is easily taken out)

Δ: Slightly hard to release (the test piece is slightly deformed and difficult to take out)

x: Non-releasable (the test piece is largely deformed and is not released from the runner part)

Here, with respect to the mold releasability, the higher the rates of melt crystallization of the test piece inside the die and at the runner part, the more satisfactory the moldability.

TABLE 2

|  | Resin Composition | Die Temp. (° C.) | Supercritical $CO_2$ Concentration*1 (% by wt.) | Injection Pressure (MPa) | Die Retention Time Required for Release*2 (s) |
|---|---|---|---|---|---|
| Examples |  |  |  |  |  |
| 1-1 | 1-A | 80 | 2 | 55 | 40 |
| 1-2 | 1-B | 80 | 2 | 54 | 23 |
|  |  | 70 |  | 57 | 28 |
| 1-3 | 1-C | 80 | 2 | 39 | 11 |
|  |  | 70 |  | 38 | 13 |
| 1-4 | 1-D | 70 | 5 | 30 | 10 |
| 1-5 | 1-E | 80 | 1 | 63 | 60 |
| Comparative Examples |  |  |  |  |  |
| 1-1 | 1-a | 80 | 2 | 58 | 180 |
|  |  | 70 |  | 60 | 300 |
| 1-2 | 1-A | 80 | 0 | 78 | 120 |
| 1-3 | 1-B | 80 | 0 | 77 | 60 |
|  |  | 70 |  | 91 | 120 |

*1The concentration based on the polylactic acid resin composition.
*2Total of Time for Keeping Injection Pressure and Cooling Time (s).

It was found from the results shown in Table 2 that, as compared with Comparative Example 1-1 in which the first organic crystal nucleus agent was not contained or Comparative Examples 1-2 and 1-3 in which the supercritical fluid was not brought into contact with the polylactic acid resin composition during the melt-kneading, the manufacturing method of the present invention enabled a remarkable reduction of the die retention time by the synergistic effect of the first organic crystal nucleus agent and the supercritical fluid, resulting in an improvement in moldability by leaps and bounds. The lower the die temperature was, the more remarkable the effect was. It was also found that the injection pressure upon molding was decreased by bringing the supercriti- <Bending Test>

For the prism-shaped specimen (125 mm×12 mm×6 mm), a bending test was performed according to JIS K7203 using Tensilon (Tension universal testing machine RTC-1210A, manufactured by Orientec Co., Ltd.) to determine a flexural modulus. The crosshead speed was 3 mm/min.

<Thermal Deformation Temperature (Heat Resistance)>

For the prism-shaped specimen (125 mm×12 mm×6 mm), the temperature was measured at which the specimen was deflected by 0.025 mm under a load of 0.45 MPa, according to JIS-K7207 using a thermal deformation temperature measuring device (B-32, manufactured by Toyo Seiki Seisakusho, Ltd.). The higher temperatures show more excellent heat resistances.

<Relative Crystallinity>

The test piece of the flat plate (70 mm×40 mm×3 mm) after the injection molding was crushed. After accurately weighing 7.0 to 8.0 mg of the crushed test piece, the crushed test piece was enclosed in an aluminum pan. Thereafter, using a DSC apparatus (Diamond DSC, manufactured by PerkinElmer), as the 1st RUN, the temperature was raised from 20° C. to 200° C. at a temperature rise rate of 20° C./minute, maintained at 200° C. for 5 minutes, then dropped from 200° C. to 20° C. at a temperature drop rate of −20° C./minute and maintained at 20° C. for one minute. Subsequently, as the 2nd RUN, the temperature was raised from 20° C. to 200° C. at a temperature rise rate of 20° C./minute. The absolute value $\Delta Hcc$ of the cold crystallization enthalpy of polylactic acid resin observed in the 1st RUN, and the crystal melt enthalpy $\Delta Hm$ observed in the 2nd RUN were determined, and the values obtained was used to determine the relative crystallinity (%) by the following equation.

Relative Crystallinity (%)={($\Delta Hm - \Delta Hcc)/\Delta Hm$}×100

<Bleeding Resistance>

The flat plate (70 mm×40 mm×3 mm) after the injection molding was allowed to stand in an oven at 80° C. for one month, and visually observed for the absence or presence of bleeding of the organic crystal nucleus agent and/or the plasticizer on the surface.

<Expansion Ratio>

The expansion ratio was determined by the following equation.

Expansion Ratio=(Density of Molded Article Subjected to Injection Molding Without Using Supercritical Fluid)/(Density of Molded Article Subjected to Injection Molding Using Supercritical Fluid)

Here, the density of the molded article was determined according to JIS K-7112 (Method B: Pycnometer Method).

Table 3

Therefore, it is found that the manufacturing method of the present invention is an advantageous technique as compared with the technique of achieving satisfactory moldability by the addition of plasticizer in the field which requires a polylactic acid resin molded article having high rigidity.

Synthesis Example 1-2 of Polylactic Acid Resin Composition

As polylactic acid resin compositions, the raw materials of the products (1-F to 1-J) of the present invention and the comparative product (1-b) shown in Table 4 were melt-kneaded at 230° C. in a twin screw extruder (PCM-45, manufactured by IKEGAI, Ltd.) and strand cut, to give pellets of the polylactic acid resin compositions. The resultant pellets were dried in a dehumidification dryer at 80° C. for 5 hours to a water content of 500 ppm or less.

[Table 4]

TABLE 4

| Composition of Raw Materials Formulated | Products of the Present Invention | | | | | Comparative Product |
|---|---|---|---|---|---|---|
| (Parts by Weight) | 1-F | 1-G | 1-H | 1-I | 1-J | 1-b |
| Resin | | | | | | |
| Poly-L-Lactic Acid Resin*[13] | 50 | 50 | 50 | 50 | 50 | 50 |
| Poly-D-Lactic Acid Resin*[14] | 50 | 50 | 50 | 50 | 50 | 50 |
| Organic Crystal Nucleus Agent | | | | | | |
| OHC18EB*[4] | 0.5 | 0.5 | 0.5 | — | 0.5 | — |
| OHC18Gly*[5] | — | — | — | 1 | — | — |
| PPA-Zn*[6] | — | 0.5 | 0.5 | — | 0.5 | — |

TABLE 3

| | Molding Conditions and Releasability | | | | | Physical Properties of Molded Article | | | | |
|---|---|---|---|---|---|---|---|---|---|---|
| Examples | Resin Composition | Die Temp. (° C.) | Supercritical $CO_2$ Concentration*[1] (% by wt.) | Die Retension Time (s) | Die Releasability | Flexural Modulus (GPa) | Thermal Deformation Temp. (° C.) at 0.45 MPa | Relative Crystallinity (%) | Bleeding Resistance at 80° C. for one month | Expansion Ratio |
| 1-6 | 1-B | 80 | 2 | 23 | ○ | 4.7 | 83 | 100 | No Bleeding | 1.00 |
| 1-7 | 1-C | 80 | 2 | 11 | ○ | 1.3 | 71 | 100 | No Bleeding | 1.02 |
| 1-8 | 1-D | 70 | 5 | 10 | ○ | 2.4 | 113 | 100 | No Bleeding | 1.01 |

*[1]The concentration based on the polylactic acid resin composition.

It was found from the results shown in Table 3 that the manufacturing method of the present invention enabled achievement of high crystallinity by the synergistic effect of the first organic crystal nucleus agent and the supercritical fluid, and thus a polylactic acid resin injection molded article having excellent heat resistance was obtained.

In addition, the manufacturing method of the present invention enables achievement of satisfactory moldability without adding plasticizer. While, adding a plasticizer makes the rigidity lower, but the manufacturing method of the present invention enables achievement of satisfactory moldability without adding plasticizer, so that a polylactic acid resin molded article having high rigidity (flexural modulus) can be obtained (as can be seen that a polylactic acid resin molded article having a high rigidity is obtained in Example 1-6 in comparison with Examples 1-7 and 1-8).

TABLE 4-continued

| Composition of Raw Materials Formulated | Products of the Present Invention | | | | | Comparative Product |
|---|---|---|---|---|---|---|
| (Parts by Weight) | 1-F | 1-G | 1-H | 1-I | 1-J | 1-b |
| Plasticizer | | | | | | |
| (MeEO$_3$)2SA*[7] | — | — | 10 | 12.5 | 5 | — |
| Hydrolysis Inhibitor | | | | | | |
| MCI*[8] | 1 | 1 | 1 | — | 1 | 1 |
| PCI*[9] | — | — | — | 1 | — | — |

TABLE 4-continued

| Composition of Raw Materials Formulated | Products of the Present Invention | | | | | Comparative Product |
|---|---|---|---|---|---|---|
| (Parts by Weight) | 1-F | 1-G | 1-H | 1-I | 1-J | 1-b |
| Inorganic Filler | | | | | | |
| Talc*[10] | — | — | — | 20 | — | — |
| Glass Fiber*[11] | — | — | — | — | 12 | — |
| Flame Retardant | | | | | | |
| Al(OH)$_3$*[12] | — | — | — | — | 120 | — |

Here, the raw materials in Table 4 represent the same as the raw materials in Table 1, and the other raw materials are described below.

<Polylactic Acid Resin>

*13: Polylactic acid resin (poly-L-lactic acid resin) obtained in Synthesis Example 1-1 of Polylactic Acid Resin described below

*14: Polylactic acid resin (poly-D-lactic acid resin) obtained in Synthesis Example 1-2 of Polylactic Acid Resin described below Synthesis Example 1-1 of Polylactic Acid Resin
(Production of Poly-L-lactic Acid Resin)

To 100 parts by weight of L-lactide (manufactured by Musashino Chemical Laboratory, Ltd., optical purity: 100%), 0.005 parts by weight of tin octylate was added. The mixture was reacted under a nitrogen atmosphere in a reactor having an agitating blade at 180° C. for 2 hours, subsequently placed under reduced pressure to remove the remaining lactide, and made into chips to obtain poly-L-lactic acid. The resultant poly-L-lactic acid had a weight-average molecular weight of 110,000, a glass transition temperature (Tg) of 60° C. and a melting point of 166° C.

Synthesis Example 1-2 of Polylactic Acid Resin
(Production of Poly-D-lactic Acid Resin)

To 100 parts by weight of D-lactide (manufactured by Musashino Chemical Laboratory, Ltd., optical purity: 100%), 0.005 parts by weight of tin octylate was added. The mixture was reacted under a nitrogen atmosphere in a reactor having an agitating blade at 180° C. for 2 hours, subsequently placed under reduced pressure to remove the remaining lactide, and made into chips to obtain poly-D-lactic acid. The resultant poly-D-lactic acid had a weight-average molecular weight of 110,000, a glass transition temperature (Tg) of 60° C. and a melting point of 167° C.

Examples 1-9 to 1-13 and Comparative Example 1-4

The pellets of the polylactic acid resin compositions (the products 1-F and 1-J of the present invention and the comparative product 1-b) obtained in Synthesis Example 1-2 were supplied into an injection molding machine (Mucell 85 ton, manufactured by The Japan Steel Works, Ltd.) set at a cylinder temperature of 230° C. for melting, while a supercritical fluid (carbon dioxide in a supercritical state) pressurized to 8 MPa was introduced through the gas inlet port provided at the cylinder section of the injection molding machine in the concentration shown in Table 5. The supercritical fluid was brought into contact with the polylactic acid resin composition in a melted state by kneading with the screw. The temperature inside the die attached to the tip of the injection molding machine was maintained at the temperature shown in Table 5, and the melted polylactic acid resin composition in contact with the carbon dioxide in a supercritical state was molded with injection-molding in this die at an injection pressure required for the molding as shown in Table 5, and retained therein until the crystallization was completed, to obtain a test piece (150 mm×30 mm×1 mm in thickness). The die retention time required for the release of the resultant test piece was evaluated in the same manner as in Example 1-1. The results are shown in Table 5.

Comparative Examples 1-5 to 1-6

In the same manner as in Example 1-9, except that the pellets of the polylactic acid resin compositions (the products 1-F and 1-G of the present invention) obtained in Synthesis Example 1-2 were used, carbon dioxide in a supercritical state was not introduced under the pressure, and the injection molding was performed at the die temperature shown in Table 5 at an injection pressure required for the molding as shown in Table 5, a test piece was obtained and the die retention time required for the release was evaluated in the same manner. The results are shown in Table 5.

[Table 5]

TABLE 5

| | Resin Composition | Die Temp. (° C.) | Supercritical CO$_2$ Concentration*[1] (%) | Injection Pressure (MPa) | Die Retention Time Required for Release*[2] (s) |
|---|---|---|---|---|---|
| Examples | | | | | |
| 1-9 | 1-F | 80 | 2 | 58 | 30 |
| 1-10 | 1-G | 80 | 2 | 57 | 15 |
| | | 70 | | 58 | 20 |
| 1-11 | 1-H | 80 | 2 | 41 | 9 |
| | | 70 | | 42 | 10 |
| 1-12 | 1-I | 70 | 5 | 34 | 8 |
| 1-13 | 1-J | 80 | 1 | 66 | 20 |
| Comparative Examples | | | | | |
| 1-4 | 1-b | 80 | 2 | 61 | 150 |
| | | 70 | | 62 | 270 |
| 1-5 | 1-F | 80 | 0 | 85 | 90 |
| 1-6 | 1-G | 80 | 0 | 84 | 50 |
| | | 70 | | 98 | 90 |

*[1]The concentration based on the polylactic acid resin composition.
*[2]Total of Time for Keeping Injection Pressure and Cooling Time (s).

It was found from the results shown in Table 5 that, also in a stereocomplex polylactic acid resin, as compared with Comparative Example 1-4 in which the first organic crystal nucleus agent was not contained or Comparative Examples 1-5 and 1-6 in which the supercritical fluid was not brought into contact with the polylactic acid resin composition during the melt-kneading, the manufacturing method of the present invention enabled a remarkable reduction of the die retention time by the synergistic effect of the first organic crystal nucleus agent and the supercritical fluid, resulting in an improvement in moldability by leaps and bounds. The lower the die temperature was, the more remarkable the effect was. It was also found that the injection pressure upon molding was decreased by bringing the supercritical fluid into contact with the polylactic acid resin composition during the melt-kneading.

Examples 1-14 to 1-16 and Comparative Example 1-7

In the same manner as in Example 1-9, except that the pellets of the polylactic acid resin compositions (the products 1-G and 1-I of the present invention and the comparative product 1-b) obtained in Synthesis Example 1-2 were used, and the die temperatures, the supercritical carbon dioxide concentrations and the die retention times shown in Table 6 were employed, the injection molding was performed. With respect to the resultant test pieces [a flat plate (70 mm×40 mm×3 mm) and a prism-shaped specimen (125 mm×12 mm×6 mm)], the bending test and thermal deformation temperature were evaluated in the same manner as in Example 1-6 for the prism-shaped specimen (125 mm×12 mm×6 mm), while the relative crystallinity, bleeding resistance and expansion ratio were evaluated in the same manner as in Example 1-6 for the flat plate (70 mm×40 mm×3 mm). The results are shown in Table 6.
[Table 6]

ing plasticizer, so that a stereocomplex polylactic acid resin molded article having high rigidity (flexural modulus) can be obtained (as can be seen that a polylactic acid resin molded article having a high rigidity is obtained in Example 1-14 in comparison with Examples 1-15 and 1-16).

Therefore, it is found that the manufacturing method of the present invention is an advantageous technique as compared with the technique of achieving satisfactory moldability by the addition of plasticizer in the field which requires a stereocomplex polylactic acid resin molded article having high rigidity.

Synthesis Example 1-3 of Polylactic Acid Resin Composition

As polylactic acid resin compositions, the raw materials of the products (1-K to 1-N) of the present invention and the comparative product (1-c) shown in Table 7 were melt-kneaded at 240° C. in a twin screw extruder (PCM-45, manufactured by IKEGAI, Ltd.) and strand cut, to give pellets of the polylactic acid resin compositions. The resultant pellets were dried in a dehumidification dryer at 80° C. for 5 hours to a water content of 500 ppm or less.
[Table 7]

TABLE 7

| Composition of Raw Materials | Products of the Present Invention | | | | Comparative Product |
|---|---|---|---|---|---|
| Formulated (Parts by Weight) | 1-K | 1-L | 1-M | 1-N | 1-c |
| Resin | | | | | |
| Poly-L-Lactic Acid Resin*[15] | 50 | 70 | 80 | 70 | 70 |
| Polycarbonate Resin*[16] | 50 | 30 | 20 | 30 | 30 |
| Organic Crystal Nucleus | | | | | |

TABLE 6

| | Resin Composition | Die Temp. (° C.) | Supercritical CO$_2$ Concentration*[1] (%) | Die Retension Time (s) | Die Releasability | Flexural Modulus (GPa) | Thermal Deformation Temp. (° C.) at 0.45 MPa | Relative Crystallinity (%) | Bleeding Resistance at 80° C. for one month | Expansion Ratio |
|---|---|---|---|---|---|---|---|---|---|---|
| Examples | | | | | | | | | | |
| 1-14 | 1-G | 80 | 2 | 15 | ○ | 4.8 | 85 | 100 | No Bleeding | 1.01 |
| 1-15 | 1-H | 80 | 2 | 9 | ○ | 1.3 | 72 | 100 | No Bleeding | 1.01 |
| 1-16 | 1-I | 70 | 5 | 8 | ○ | 2.4 | 114 | 100 | No Bleeding | 1.00 |
| Comparative Example | | | | | | | | | | |
| 1-7 | 1-b | 30 | 0 | 60 | Δ | 3.3 | 53 | 8 | No Bleeding | — |

*[1]The concentration based on the polylactic acid resin composition.

It was found from the results shown in Table 6 that the manufacturing method of the present invention enabled achievement of high crystallinity by the synergistic effect of the first organic crystal nucleus agent and the supercritical fluid, and thus a polylactic acid resin injection molded article having excellent heat resistance was obtained.

In addition, also in a stereocomplex polylactic acid resin, the manufacturing method of the present invention enables achievement of satisfactory moldability without adding plasticizer. While, adding a plasticizer makes the rigidity lower, but the manufacturing method of the present invention enables achievement of satisfactory moldability without add- TABLE 7-continued

| Composition of Raw Materials | Products of the Present Invention | | | | Comparative Product |
|---|---|---|---|---|---|
| Formulated (Parts by Weight) | 1-K | 1-L | 1-M | 1-N | 1-c |
| Agent | | | | | |
| OHC18EB*[4] | 0.25 | 0.35 | 0.40 | 0.35 | — |
| OHC18Gly*[5] | — | — | — | — | — |
| PPA-Zn*[6] | 0.25 | 0.35 | 0.40 | 0.35 | — |

TABLE 7-continued

| Composition of Raw Materials | Products of the Present Invention | | | | Comparative Product |
|---|---|---|---|---|---|
| Formulated (Parts by Weight) | 1-K | 1-L | 1-M | 1-N | 1-c |
| Plasticizer | | | | | |
| (MeEO₃)2SA*[7] | — | — | — | 7 | — |
| Hydrolysis Inhibitor | | | | | |
| MCI*[8] | 1 | 1 | 1 | 1 | 1 |
| PCI*[9] | — | — | — | — | — |
| Inorganic Filler | | | | | |
| Talc*[10] | — | — | — | — | — |
| Glass Fiber*[11] | — | — | — | — | — |
| Flame Retardant | | | | | |
| Al(OH)₃*[12] | — | — | — | — | — |

Here, the raw materials in Table 7 represent the same as the raw materials in Table 1, and the other raw materials are described below.
<Resin>
  *15: Polylactic acid resin (Nature Works 4032D, manufactured by Nature Works)
  (Optical purity: 98.5%, weight-average molecular weight: 141,000, residual monomer: 1,200 ppm)
  *16: Polycarbonate resin (Panlite L-1250Y, manufactured by TEIJIN CHEMICALS LTD.)
  (Crystallinity: 0%, glass transition temperature: 120° C.)

Examples 1-17 to 1-20 and Comparative Example 1-8

The pellets of the polylactic acid resin compositions (the products 1-K to 1-N of the present invention and the comparative product 1-c) obtained in Synthesis Example 1-3 were supplied into an injection molding machine (Mucell 85 ton, manufactured by The Japan Steel Works, Ltd.) set at a cylinder temperature of 220° C. for melting, while a supercritical fluid (carbon dioxide in a supercritical state) pressurized to 8 MPa was introduced through the gas inlet port provided at the cylinder section of the injection molding machine in the concentration shown in Table 8. The supercritical fluid was brought into contact with the polylactic acid resin composition in a melted state by kneading with the screw. The temperature inside the die attached to the tip of the injection molding machine was maintained at the temperature shown in Table 8, and the melted polylactic acid resin composition in contact with the carbon dioxide in a supercritical state was molded with injection-molding in this die at an injection pressure required for the molding as shown in Table 8, and retained therein until the crystallization was completed, to obtain a test piece (150 mm×30 mm×1 mm in thickness). The die retention time required for the release of the resultant test piece was evaluated in the same manner as in Example 1-1. The results are shown in Table 8.

Comparative Examples 1-9 to 1-12

In the same manner as in Example 1-17, except that the pellets of the polylactic acid resin compositions (the products 1-K to 1-N of the present invention) obtained in Synthesis Example 1-3 were used, carbon dioxide in a supercritical state was not introduced under the pressure, and the injection molding was performed at the die temperature shown in Table 8 at an injection pressure required for the molding as shown in Table 8, a test piece was obtained and the die retention time required for the release was evaluated in the same manner. The results are shown in Table 8.

[Table 8]

TABLE 8

| | Resin Composition | Die Temp. (° C.) | Supercritical $CO_2$ Concentration*[1] (%) | Injection Pressure (MPa) | Die Retention Time Required for Release*[2] (s) |
|---|---|---|---|---|---|
| Examples | | | | | |
| 1-17 | 1-K | 80 | 2 | 98 | 23 |
| 1-18 | 1-L | 80 | 2 | 81 | 25 |
| 1-19 | 1-M | 80 | 2 | 72 | 26 |
| 1-20 | 1-N | 80 | 2 | 62 | 10 |
| Comparative Examples | | | | | |
| 1-8 | 1-c | 80 | 2 | 74 | 150 |
| 1-9 | 1-K | 80 | 0 | 120 | 60 |
| 1-10 | 1-L | 80 | 0 | 112 | 60 |
| 1-11 | 1-M | 80 | 0 | 95 | 60 |
| 1-12 | 1-N | 80 | 0 | 80 | 40 |

*[1]The concentration based on the polylactic acid resin composition.
*[2]Total of Time for Keeping Injection Pressure and Cooling Time (s).

It was found from the results shown in Table 8 that, also in a mixture system of the polylactic acid resin and another thermoplastic resin, as compared with Comparative Example 1-8 in which the first organic crystal nucleus agent was not contained or Comparative Examples 1-9 to 1-12 in which the supercritical fluid was not brought into contact with the polylactic acid resin composition during the melt-kneading, the manufacturing method of the present invention enabled a remarkable reduction of the die retention time by the synergistic effect of the first organic crystal nucleus agent and the supercritical fluid, resulting in an improvement in moldability by leaps and bounds. The lower the die temperature was, the more remarkable the effect was. It was also found that the injection pressure upon molding was decreased by bringing the supercritical fluid into contact with the polylactic acid resin composition during the melt-kneading.

Examples 1-21 to 1-24 and Comparative Example 1-13

In the same manner as in Example 1-17, except that the pellets of the polylactic acid resin compositions (the products 1-K to 1-N of the present invention and the comparative product 1-c) obtained in Synthesis Example 1-3 were used, and the die temperatures, the supercritical carbon dioxide concentrations and the die retention times shown in Table 9 were employed, the injection molding was performed. With respect to the resultant test pieces [a flat plate (70 mm×40 mm×3 mm) and a prism-shaped specimen (125 mm×12 mm×6 mm)], the bending test and thermal deformation temperature were evaluated in the same manner as in Example 1-6 for the prism-shaped specimen (125 mm×12 mm×6 mm), while the relative crystallinity, bleeding resistance and expansion ratio were evaluated in the same manner as in Example 1-6 for the flat plate (70 mm×40 mm×3 mm). The results are shown in Table 9.

Synthesis Example 1-4 of Polylactic Acid Resin Composition

As polylactic acid resin compositions, the raw materials of the products (1-O to 1-P) of the present invention shown in Table 10 were melt-kneaded at 190° C. in a twin screw extruder (PCM-45, manufactured by IKEGAI, Ltd.) and strand cut, to give pellets of the polylactic acid resin compositions. The resultant pellets were dried at 70° C. under reduced pressure for one day to a water content of 500 ppm or less.

TABLE 9

| | Resin Composition | Die Temp. (° C.) | Supercritical $CO_2$ Concentration*[1] (%) | Die Retension Time (s) | Die Releasability | Flexural Modulus (GPa) | Thermal Deformation Temp. (° C.) at 0.45 MPa | Relative Crystallinity (%) | Bleeding Resistance at 80° C. for one month | Expansion Ratio |
|---|---|---|---|---|---|---|---|---|---|---|
| Examples | | | | | | | | | | |
| 1-21 | 1-K | 80 | 2 | 23 | ○ | 3.6 | 110 | 100 | No Bleeding | 1.01 |
| 1-22 | 1-L | 80 | 2 | 25 | ○ | 4.0 | 122 | 100 | No Bleeding | 1.02 |
| 1-23 | 1-M | 80 | 2 | 26 | ○ | 4.2 | 125 | 100 | No Bleeding | 1.00 |
| 1-24 | 1-N | 80 | 2 | 10 | ○ | 1.8 | 90 | 100 | No Bleeding | 1.01 |
| Comparative Example | | | | | | | | | | |
| 1-13 | 1-c | 30 | 0 | 60 | Δ | 2.7 | 65 | 7 | No Bleeding | — |

*[1]The concentration based on the polylactic acid resin composition.

It was found from the results shown in Table 9 that the manufacturing method of the present invention enabled achievement of high crystallinity by the synergistic effect of the first organic crystal nucleus agent and the supercritical fluid, and thus a polylactic acid resin injection molded article having excellent heat resistance was obtained.

In addition, also in a mixture system of the polylactic acid resin and another thermoplastic resin, the manufacturing method of the present invention enables achievement of satisfactory moldability without adding plasticizer, and high heat resistance is achieved by blending the polylactic acid having high crystallinity with another thermoplastic resin having high Tg. While, adding a plasticizer makes the rigidity lower, but the manufacturing method of the present invention enables achievement of satisfactory moldability while allowing for crystallization of polylactic acid without adding plasticizer, so that a polylactic acid resin molded article having high rigidity (flexural modulus) can be obtained (as can be seen that a polylactic acid resin molded article having a high rigidity is obtained in Examples 1-21 to 1-23 in comparison with Example 1-24).

Therefore, it is found that the manufacturing method of the present invention is an advantageous technique as compared with the technique of achieving satisfactory moldability while allowing for crystallization of polylactic acid by the addition of plasticizer in the field which requires a polylactic acid resin molded article containing another thermoplastic resin having high rigidity and high Tg to have higher heat resistance and higher rigidity.

TABLE 10

| Composition of Raw Materials | Products of the Present Invention | |
|---|---|---|
| Formulated (Parts by Weight) | 1-O | 1-P |
| Resin | | |
| U'z S-17*[2] | 100 | — |
| LACEA H-400*[3] | — | 100 |
| Organic Crystal Nucleus Agent | | |
| OHC18EB*[4] | 0.5 | 0.5 |
| OHC18Gly*[5] | — | — |
| PPA-Zn*[6] | 0.5 | 0.5 |
| Plasticizer | | |
| (MeEO$_3$)2SA*[7] | 5 | 5 |
| Hydrolysis Inhibitor | | |
| MCI*[8] | 1 | 1 |
| PCI*[9] | — | — |
| Inorganic Filler | | |
| Talc*[10] | — | — |
| Glass Fiber*[11] | 12 | 12 |
| Flame Retardant | | |
| Al(OH)$_3$*[12] | 120 | 120 |

Here, the raw materials in Table 10 represent the same as the raw materials in Table 1.

Examples 1-26 and 1-27

The pellets of the polylactic acid resin compositions (the products 1-O to 1-P of the present invention) obtained in Synthesis Example 1-4 were supplied into an injection molding machine (Mucell 85 ton, manufactured by The Japan Steel Works, Ltd.) set at a cylinder temperature of 200° C. for melting, while a supercritical fluid (carbon dioxide in a supercritical state) pressurized to 8 MPa was introduced through the gas inlet port provided at the cylinder section of the injection molding machine in the concentration shown in Table 11. The supercritical fluid was brought into contact with the polylactic acid resin composition in a melted state by kneading with the screw. The temperature inside the die attached to the tip of the injection molding machine was maintained at the temperature shown in Table 11, and the melted polylactic acid resin composition in contact with the carbon dioxide in a supercritical state was molded with injection-molding in this die at an injection pressure required for the molding as shown in Table 11, and retained therein until the crystallization was completed, to obtain a test piece (150 mm×30 mm×1 mm in thickness). The die retention time required for the release of the resultant test piece was evaluated in the same manner as in Example 1-1. The results are shown in Table 11.

TABLE 11

| Examples | Resin Composition | Die Temp. (° C.) | Supercritical $CO_2$ Concentration*[1] (%) | Injection Pressure (MPa) | Die Retention Time Required for Release*[2] (s) |
|---|---|---|---|---|---|
| 1-26 | 1-O | 80 | 1 | 45 | 25 |
|  |  | 70 |  | 47 | 27 |
| 1-27 | 1-P | 80 | 2 | 55 | 25 |
|  |  | 70 |  | 56 | 28 |

*[1]The concentration based on the polylactic acid resin composition.
*[2]Total of Time for Keeping Injection Pressure and Cooling Time (s).

It was found from the results shown in Table 11 that the manufacturing method of the present invention enabled a remarkable reduction of the die retention time by the synergistic effect of the first organic crystal nucleus agent and the supercritical fluid, resulting in an improvement in moldability by leaps and bounds. The lower the die temperature was, the more remarkable the effect was. It was also found that the injection pressure upon molding was decreased by bringing the supercritical fluid into contact with the polylactic acid resin composition during the melt-kneading.

Synthesis Example 2-1 of Polylactic Acid Resin Composition

As polylactic acid resin compositions, the raw materials of the products (2-A to 2-D) of the present invention and the comparative product (2-a) shown in Table 12 were melt-kneaded at 190° C. in a twin screw extruder (PCM-45, manufactured by IKEGAI, Ltd.) and strand cut, to give pellets of the polylactic acid resin compositions. The resultant pellets were dried at 70° C. under reduced pressure for one day to a water content of 500 ppm or less.

TABLE 12

| Polylactic Acid Resin Composition [Ratio of Content (Weight Ratio)] | |
|---|---|
| Products of the Present Invention | |
| 2-A | U'z S-12*[1]/PPA-Zn*[3]/MCI*[6] = 100/0.5/1 |
| 2-B | U'z S-12*[1]/PPA-Zn*[3]/OHC18EB*[4]/MCI*[6] = 100/0.5/0.5/1 |
| 2-C | U'z S-12*[1]/PPA-Zn*[3]/OHC18EB*[4]/(MeEO3)2SA*[5]/MCI*[6] = 100/0.5/0.5/10/1 |

TABLE 12-continued

| Polylactic Acid Resin Composition [Ratio of Content (Weight Ratio)] | |
|---|---|
| 2-D | LACEA H-400*[2]/PPA-Zn*[3]/OHC18EB*[4]/(MeEO3)2SA*[5]/Al(OH)3*[8]/Glass Fiber*[11]/MCI*[6] = 100/0.5/0.5/5/120/12/1 |
| Comparative Product | |
| 2-a | U'z S-12*[1]/MCI*[6] = 100/1 |

Here, the raw materials in Table 12 represent as follows.
<Polylactic Acid Resin>
  *1: Polylactic acid resin (Eco Plastic U'zS-12, manufactured by TOYOTA MOTOR CORPORATION)
  (Optical purity: 99.6%, weight-average molecular weight: 112,000, residual monomer: 173 ppm)
  *2: Polylactic acid resin (LACEA H-400, manufactured by Mitsui Chemicals, Inc.)
  (Optical purity: 98.5%, weight-average molecular weight: 142,000, residual monomer: 1,200 ppm)
<Metal Salt of Phenylphosphonic Acid>
  *3: Zinc salt of non-substituted phenylphosphonic acid (trade name: PPA-Zn, manufactured by NISSAN CHEMICAL INDUSTRIES, LTD.)
<Another Organic Crystal Nucleus Agent>
  *4: Ethylenebis-12-hydroxystearic acid amide (SLIPAX H, manufactured by Nippon Kasei Chemical Co., Ltd.)
<Plasticizer>
  *5: Diester of succinic acid and triethylene glycol monomethyl ether obtained in Synthesis Example 2-1 of Plasticizer described below
<Hydrolysis Inhibitor>
  *6: Stabaxol 1-LF (manufactured by Rhein Chemie Japan)
<Inorganic Filler>
  *7: Glass fiber (ECS03T-187, manufactured by Nippon Electric Glass Co., Ltd.)
<Flame Retardant>
  *8: Aluminum hydroxide (BT703ST, Nippon Light Metal Co., Ltd.)

Synthesis Example 2-1 of Plasticizer

In a 3-L flask equipped with a stirrer, a thermometer and a dehydration tube, 500 g of succinic anhydride, 2,463 g of triethylene glycol monomethyl ether and 9.5 g of paratoluenesulfonic acid monohydrate were charged and the mixture was reacted under reduced pressure of 4 to 10.7 kPa at 110° C. for 15 hours, while blowing nitrogen (500 mL/minute) into the space. The acid value of the reaction solution was 1.6 (KOH mg/g). To the reaction solution, 27 g of an adsorbent Kyoward 500SH (manufactured by Kyowa Chemical Industry Co., Ltd.) was added, stirred at 80° C. at 2.7 kPa for 45 minutes, and filtered. Thereafter, triethylene glycol monomethyl ether was distilled off at a liquid temperature of 115 to 200° C. at a pressure of 0.03 kPa. After cooling to 80° C., the residual liquid was filtered under reduced pressure, to give a diester of succinic acid and triethylene glycol monomethyl ether as a filtrate. The resultant diester had an acid value of 0.2 (KOH mg/g), a saponification value of 276 (KOH mg/g), a hydroxyl value of 1 or less (KOH mg/g) and a hue of APHA200.

Examples 2-1 to 2-4 and Comparative Example 2-1

The pellets of the polylactic acid resin compositions (the products 2-A to 2-D of the present invention and the comparative product 2-a) obtained in Synthesis Example 2-1 were supplied into an injection molding machine (Mucell 85 ton, manufactured by The Japan Steel Works, Ltd.) set at a cylinder temperature of 200° C. for melting, while a supercritical fluid (carbon dioxide in a supercritical state) pressurized to 8 MPa was introduced through the gas inlet port provided at the cylinder section of the injection molding machine in the concentration shown in Table 13. The supercritical fluid was brought into contact with the polylactic acid resin composition in a melted state by kneading with the screw. The temperature inside the die attached to the tip of the injection molding machine was maintained at the temperature shown in Table 13, and the melted polylactic acid resin composition in contact with the carbon dioxide in a supercritical state was molded with injection-molding in this die at an injection pressure required for the molding as shown in Table 13, and retained therein until the crystallization was completed, to obtain a test piece (150 mm×30 mm×1 mm in thickness). The die retention time required for the release of the resultant test piece was evaluated by the following criteria. The results are shown in Table 13.

<Evaluation Criteria for Die Retention Time Required for Release>

The time taken to be decided that each test piece was not deformed and was easily taken out under the molding conditions shown in Table 13 was defined as the die retention time required for the release. Here, the higher the rates of melt crystallization of the test piece inside the die and at the runner part, the shorter the die retention time required for the release.

Comparative Examples 2-2 and 2-3

In the same manner as in Example 2-1, except that the pellets of the polylactic acid resin compositions (the products 2-A and 2-B of the present invention) obtained in Synthesis Example 2-1 were used, carbon dioxide in a supercritical state was not introduced under the pressure, and the injection molding was performed at the die temperature shown in Table 13 at an injection pressure required for the molding as shown in Table 13, a test piece was obtained and the die retention time required for the release was evaluated in the same manner. The results are shown in Table 13.

TABLE 13

| | Resin Composition | Die Temp. (° C.) | Supercritical $CO_2$ Concentration*[1] (% by wt.) | Injection Pressure (MPa) | Die Retention Time Required for Release*[2] (s) |
|---|---|---|---|---|---|
| Examples | | | | | |
| 2-1 | 2-A | 80 | 2 | 54 | 50 |
| 2-2 | 2-B | 80 | 2 | 54 | 23 |
| | | 70 | | 57 | 28 |
| 2-3 | 2-C | 80 | 2 | 39 | 11 |
| | | 70 | | 38 | 13 |
| 2-4 | 2-D | 80 | 1 | 63 | 60 |
| Comparative Examples | | | | | |
| 2-1 | 2-a | 80 | 2 | 58 | 180 |
| | | 70 | | 60 | 300 |
| 2-2 | 2-A | 80 | 0 | 80 | 130 |
| 2-3 | 2-B | 80 | 0 | 77 | 60 |
| | | 70 | | 91 | 120 |

*[1]The concentration based on the polylactic acid resin composition.
*[2]Total of Time for Keeping Injection Pressure and Cooling Time (s).

It was found from the results shown in Table 13 that, as compared with Comparative Example 2-1 in which a metal salt of phenylphosphonic acid was not contained or Comparative Examples 2-2 and 2-3 in which the supercritical fluid was not brought into contact with the polylactic acid resin composition during the melt-kneading, the manufacturing method of the present invention enabled a remarkable reduction of the die retention time by the synergistic effect of the metal salt of phenylphosphonic acid and the supercritical fluid, resulting in an improvement in moldability by leaps and bounds. The lower the die temperature was, the more remarkable the effect was. It was also found that the injection pressure upon molding was decreased by bringing the supercritical fluid into contact with the polylactic acid resin composition during the melt-kneading.

Examples 2-5 and 2-6

In the same manner as in Example 2-1, except that the pellets of the polylactic acid resin compositions (the products 2-B to 2-C of the present invention) obtained in Synthesis Example 2-1 were used, and the die temperatures, the supercritical carbon dioxide concentrations and the die retention times shown in Table 14 were employed, the injection molding was performed. With respect to the resultant test pieces [a flat plate (70 mm×40 mm×3 mm) and a prism-shaped specimen (125 mm×12 mm×6 mm)], the bending test and thermal deformation temperature were evaluated by the following methods for the prism-shaped specimen (125 mm×12 mm×6 mm), while the relative crystallinity, bleeding resistance and expansion ratio were evaluated by the following methods for the flat plate (70 mm×40 mm×3 mm). The results are shown in Table 14.

<Criteria for Evaluation of Die Releasability>
○: Very easily releasable (the test piece is not deformed and is easily taken out)
Δ: Slightly hard to release (the test piece is slightly deformed and difficult to take out)
x: Non-releasable (the test piece is largely deformed and is not released from the runner part)
Here, with respect to the mold releasability, the higher the rates of melt crystallization of the test piece inside the die and at the runner part, the more satisfactory the moldability.

<Bending Test>
For the prism-shaped specimen (125 mm×12 mm×6 mm), a bending test was performed according to JIS K7203 using Tensilon (Tensilon universal testing machine RTC-1210A, manufactured by Orientec Co., Ltd.) to determine a flexural modulus. The crosshead speed was 3 mm/min.

<Thermal Deformation Temperature (Heat Resistance)>
For the prism-shaped specimen (125 mm×12 mm×6 mm), the temperature was measured at which the specimen was deflected by 0.025 mm under a load of 0.45 MPa, according to JIS-K7207 using a thermal deformation temperature measuring device (B-32, manufactured by Toyo Seiki Seisakusho, Ltd.). The higher temperatures show more excellent heat resistances.

<Bleeding Resistance>
The flat plate (70 mm×40 mm×3 mm) after the injection molding was allowed to stand in an oven at 80° C. for one month, and visually observed for the absence or presence of bleeding of the organic crystal nucleus agent and/or the plasticizer on the surface.

<Expansion Ratio>

The expansion ratio was determined by the following equation.

Expansion Ratio=(Density of Molded Article Subjected to Injection Molding Without Using Supercritical Fluid)/(Density of Molded Article Subjected to Injection Molding Using Supercritical Fluid)

Here, the density of the molded article was determined according to JIS K-7112 (Method B: Pycnometer Method).

TABLE 14

| | | Molding Conditions and Releasability | | | | Physical Properties of Molded Article | | | | |
|---|---|---|---|---|---|---|---|---|---|---|
| Examples | Resin Composition | Die Temp. (° C.) | Supercritical $CO_2$ Concentration*1 (% by wt.) | Die Retension Time (s) | Die Releasability | Flexural Modulus (GPa) | Thermal Deformation Temp. (° C.) at 0.45 MPa | Relative Crystallinity (%) | Bleeding Resistance at 80° C. for one month | Expansion Ratio |
| 2-5 | 2-B | 80 | 2 | 23 | ○ | 4.7 | 83 | 100 | No Bleeding | 1.00 |
| 2-6 | 2-C | 80 | 2 | 11 | ○ | 1.3 | 71 | 100 | No Bleeding | 1.02 |

*1 The concentration based on the polylactic acid resin composition.

<Relative Crystallinity>

The test piece of the flat plate (70 mm×40 mm×3 mm) after the injection molding was crushed. After accurately weighing 7.0 to 8.0 mg of the crushed test piece, the crushed test piece was enclosed in an aluminum pan. Thereafter, using a DSC apparatus (Diamond DSC, manufactured by PerkinElmer), as the 1st RUN, the temperature was raised from 20° C. to 200° C. at a temperature rise rate of 20° C./minute, maintained at 200° C. for 5 minutes, then dropped from 200° C. to 20° C. at a temperature drop rate of −20° C./minute and maintained at 20° C. for one minute. Subsequently, as the 2nd RUN, the temperature was raised from 20° C. to 200° C. at a temperature rise rate of 20° C./minute. The absolute value ΔHcc of the cold crystallization enthalpy of polylactic acid resin observed in the 1st RUN, and the crystal melt enthalpy ΔHm observed in the 2nd RUN were determined, and the values obtained was used to determine the relative crystallinity (%) by the following equation.

Relative Crystallinity (%)={(ΔHm−ΔHcc)/ΔHm}×100

It was found from the results shown in Table 14 that the manufacturing method of the present invention enabled achievement of high crystallinity by the synergistic effect of the metal salt of phenylphosphonic acid and the supercritical fluid, and thus a polylactic acid resin injection molded article having excellent heat resistance was obtained.

In addition, the manufacturing method of the present invention enables achievement of satisfactory moldability without adding plasticizer. While, adding a plasticizer makes the rigidity lower, but the manufacturing method of the present invention enables achievement of satisfactory moldability without adding plasticizer, so that a polylactic acid resin molded article having high rigidity (flexural modulus) can be obtained (as can be seen that a polylactic acid resin molded article having a high rigidity is obtained in Example 2-5 in comparison with Example 2-6).

Therefore, it is found that the manufacturing method of the present invention is an advantageous technique as compared with the technique of achieving satisfactory moldability by the addition of plasticizer in the field which requires a polylactic acid resin molded article having high rigidity.

Synthesis Example 2-2 of Polylactic Acid Resin Composition

As polylactic acid resin compositions, the raw materials of the products (2-E to 2-H) of the present invention and the comparative product (2-b) shown in Table 15 were melt-kneaded at 230° C. in a twin screw extruder (PCM-45, manufactured by IKEGAI, Ltd.) and strand cut, to give pellets of the polylactic acid resin compositions. The resultant pellets were dried in a dehumidification dryer at 80° C. for 5 hours to a water content of 500 ppm or less.

TABLE 15

| Composition of Raw Materials | Products of the Present Invention | | | | Comparative Product |
|---|---|---|---|---|---|
| Formulated (Parts by Weight) | 2-E | 2-F | 2-G | 2-H | 2-b |
| Resin | | | | | |
| Poly-L-Lactic Acid Resin*9 | 50 | 50 | 50 | 50 | 50 |
| Poly-D-Lactic Acid Resin*10 | 50 | 50 | 50 | 50 | 50 |
| Organic Crystal Nucleus Agent | | | | | |
| PPA-Zn*3 | 0.5 | 0.5 | 0.5 | 0.5 | — |
| OHC18EB*4 | — | 0.5 | 0.5 | 0.5 | — |
| Plasticizer | | | | | |
| (MeEO$_3$)2SA*5 | — | — | 10 | 5 | — |
| Hydrolysis Inhibitor | | | | | |
| MCI*6 | 1 | 1 | 1 | 1 | 1 |
| Inorganic Filler | | | | | |
| Glass Fiber*7 | — | — | — | 12 | — |
| Flame Retardant | | | | | |
| Al(OH)$_3$*8 | — | — | — | 120 | — |

Here, the raw materials in Table 15 represent the same as the raw materials in Table 12, and the other raw materials are described below.

<Polylactic Acid Resin>
  *9: Polylactic acid resin (poly-L-lactic acid resin) obtained in Synthesis Example 2-1 of Polylactic Acid Resin described below
  *10: Polylactic acid resin (poly-D-lactic acid resin) obtained in Synthesis Example 2-2 of Polylactic Acid Resin described below Synthesis Example 2-1 of Polylactic Acid Resin
(Production of Poly-L-lactic Acid Resin)

To 100 parts by weight of L-lactide (manufactured by Musashino Chemical Laboratory, Ltd., optical purity: 100%), 0.005 parts by weight of tin octylate was added. The mixture was reacted under a nitrogen atmosphere in a reactor having an agitating blade at 180° C. for 2 hours, subsequently placed under reduced pressure to remove the remaining lactide, and made into chips to obtain poly-L-lactic acid. The resultant poly-L-lactic acid had a weight-average molecular weight of 110,000, a glass transition temperature (Tg) of 60° C. and a melting point of 166° C.

Synthesis Example 2-2 of Polylactic Acid Resin
(Production of Poly-D-lactic Acid Resin)

To 100 parts by weight of D-lactide (manufactured by Musashino Chemical Laboratory, Ltd., optical purity: 100%), 0.005 parts by weight of tin octylate was added. The mixture was reacted under a nitrogen atmosphere in a reactor having an agitating blade at 180° C. for 2 hours, subsequently placed under reduced pressure to remove the remaining lactide, and made into chips to obtain poly-D-lactic acid. The resultant poly-D-lactic acid had a weight-average molecular weight of 110,000, a glass transition temperature (Tg) of 60° C. and a melting point of 167° C.

Examples 2-7 to 2-10 and Comparative Example 2-4

The pellets of the polylactic acid resin compositions (the products 2-E to 2-H of the present invention and the comparative product 2-b) obtained in Synthesis Example 2-2 were supplied into an injection molding machine (Mucell 85 ton, manufactured by The Japan Steel Works, Ltd.) set at a cylinder temperature of 230° C. for melting, while a supercritical fluid (carbon dioxide in a supercritical state) pressurized to 8 MPa was introduced through the gas inlet port provided at the cylinder section of the injection molding machine in the concentration shown in Table 16. The supercritical fluid was brought into contact with the polylactic acid resin composition in a melted state by kneading with the screw. The temperature inside the die attached to the tip of the injection molding machine was maintained at the temperature shown in Table 16, and the melted polylactic acid resin composition in contact with the carbon dioxide in a supercritical state was molded with injection-molding in this die at an injection pressure required for the molding as shown in Table 16, and retained therein until the crystallization was completed, to obtain a test piece (150 mm×30 mm×1 mm in thickness). The die retention time required for the release of the resultant test piece was evaluated in the same manner as in Example 2-1. The results are shown in Table 16.

Comparative Examples 2-5 and 2-6

In the same manner as in Example 2-9, except that the pellets of the polylactic acid resin compositions (the products 2-E and 2-F of the present invention) obtained in Synthesis Example 2-2 were used, carbon dioxide in a supercritical state was not introduced under the pressure, and the injection molding was performed at the die temperature shown in Table 16 at an injection pressure required for the molding as shown in Table 16, a test piece was obtained and the die retention time required for the release was evaluated in the same manner. The results are shown in Table 16.

TABLE 16

| | Resin Composition | Die Temp. (° C.) | Supercritical CO$_2$ Concentration*1 (%) | Injection Pressure (MPa) | Die Retention Time Required for Release*2 (s) |
|---|---|---|---|---|---|
| Examples | | | | | |
| 2-7 | 2-E | 80 | 2 | 58 | 40 |
| 2-8 | 2-F | 80 | 2 | 57 | 15 |
| | | 70 | | 58 | 20 |
| 2-9 | 2-G | 80 | 2 | 41 | 9 |
| | | 70 | | 42 | 10 |
| 2-10 | 2-H | 80 | 1 | 66 | 20 |

TABLE 16-continued

| | Resin Composition | Die Temp. (° C.) | Supercritical $CO_2$ Concentration[*1] (%) | Injection Pressure (MPa) | Die Retention Time Required for Release[*2] (s) |
|---|---|---|---|---|---|
| Comparative Examples | | | | | |
| 2-4 | 2-b | 80 | 2 | 61 | 150 |
| | | 70 | | 62 | 270 |
| 2-5 | 2-E | 80 | 0 | 85 | 100 |
| 2-6 | 2-F | 80 | 0 | 84 | 50 |
| | | 70 | | 98 | 90 |

[*1] The concentration based on the polylactic acid resin composition.
[*2] Total of Time for Keeping Injection Pressure and Cooling Time (s).

It was found from the results shown in Table 16 that, also in a stereocomplex polylactic acid resin, as compared with Comparative Example 2-4 in which a metal salt of phenylphosphonic acid was not contained or Comparative Examples 2-5 and 2-6 in which the supercritical fluid was not brought into contact with the polylactic acid resin composition during the melt-kneading, the manufacturing method of the present invention enabled a remarkable reduction of the die retention time by the synergistic effect of the metal salt of phenylphosphonic acid and the supercritical fluid, resulting in an improvement in moldability by leaps and bounds. The lower the die temperature was, the more remarkable the effect was. It was also found that the injection pressure upon molding was decreased by bringing the supercritical fluid into contact with the polylactic acid resin composition during the melt-kneading.

Examples 2-11 and 2-12 and Comparative Example 2-7

In the same manner as in Example 2-7, except that the pellets of the polylactic acid resin compositions (the products 2-G and 2-H of the present invention and the comparative product 2-b) obtained in Synthesis Example 2-2 were used, and the die temperatures, the supercritical carbon dioxide concentrations and the die retention times shown in Table 17 were employed, the injection molding was performed. With respect to the resultant test pieces [a flat plate (70 mm×40 mm×3 mm) and a prism-shaped specimen (125 mm×12 mm×6 mm)], the bending test and thermal deformation temperature were evaluated in the same manner as in Example 2-5 for the prism-shaped specimen (125 mm×12 mm×6 mm), while the relative crystallinity, bleeding resistance and expansion ratio were evaluated in the same manner as in Example 2-5 for the flat plate (70 mm×40 mm×3 mm). The results are shown in Table 17.

TABLE 17

| | Resin Composition | Die Temp. (° C.) | Supercritical $CO_2$ Concentration[*1] (%) | Die Retention Time (s) | Die Releasability | Flexural Modulus (GPa) | Thermal Deformation Temp. (° C.) at 0.45 MPa | Relative Crystallinity (%) | Bleeding Resistance at 80° C. for one month | Expansion Ratio |
|---|---|---|---|---|---|---|---|---|---|---|
| Examples | | | | | | | | | | |
| 2-11 | 2-F | 80 | 2 | 15 | ○ | 4.8 | 85 | 100 | No Bleeding | 1.01 |
| 2-12 | 2-G | 80 | 2 | 9 | ○ | 1.3 | 72 | 100 | No Bleeding | 1.01 |
| Comparative Example | | | | | | | | | | |
| 2-7 | 2-b | 30 | 0 | 60 | Δ | 3.3 | 53 | 8 | No Bleeding | — |

[*1] The concentration based on the polylactic acid resin composition.

It was found from the results shown in Table 17 that the manufacturing method of the present invention enabled achievement of high crystallinity by the synergistic effect of the metal salt of phenylphosphonic acid and the supercritical fluid, and thus a polylactic acid resin injection molded article having excellent heat resistance was obtained.

In addition, also in a stereocomplex polylactic acid resin, the manufacturing method of the present invention enables achievement of satisfactory moldability without adding plasticizer. While, adding a plasticizer makes the rigidity lower, but the manufacturing method of the present invention enables achievement of satisfactory moldability without adding plasticizer, so that a stereocomplex polylactic acid resin molded article having high rigidity (flexural modulus) can be obtained (as can be seen that a polylactic acid resin molded article having a high rigidity is obtained in Example 2-11 in comparison with Example 2-12).

Therefore, it is found that the manufacturing method of the present invention is an advantageous technique as compared with the technique of achieving satisfactory moldability by the addition of plasticizer in the field which requires a stereocomplex polylactic acid resin molded article having high rigidity.

Synthesis Example 2-3 of Polylactic Acid Resin Composition

As polylactic acid resin compositions, the raw materials of the products (2-I to 2-L) of the present invention and the comparative product (2-c) shown in Table 18 were melt-kneaded at 240° C. in a twin screw extruder (PCM-45, manufactured by IKEGAI, Ltd.) and strand cut, to give pellets of the polylactic acid resin compositions. The resultant pellets were dried in a dehumidification dryer at 80° C. for 5 hours to a water content of 500 ppm or less.

TABLE 18

| Composition of Raw Materials | Products of the Present Invention | | | | Comparative Product |
|---|---|---|---|---|---|
| Formulated (Parts by Weight) | 2-I | 2-J | 2-K | 2-L | 2-c |
| Resin | | | | | |
| Poly-L-Lactic Acid Resin*[11] | 50 | 70 | 80 | 70 | 70 |
| Polycarbonate Resin*[12] | 50 | 30 | 20 | 30 | 30 |
| Organic Crystal Nucleus Agent | | | | | |
| PPA-Zn*[3] | 0.25 | 0.35 | 0.40 | 0.35 | — |
| OHC18EB*[4] | 0.25 | 0.35 | 0.40 | 0.35 | — |
| Plasticizer | | | | | |
| (MeEO$_3$)2SA*[5] | — | — | — | 7 | — |
| Hydrolysis Inhibitor | | | | | |
| MCI*[6] | 1 | 1 | 1 | 1 | 1 |
| Inorganic Filler | | | | | |
| Glass Fiber*[7] | — | — | — | — | — |
| Flame Retardant | | | | | |
| Al(OH)$_3$*[8] | — | — | — | — | — |

Here, the raw materials in Table 18 represent the same as the raw materials in Table 12, and the other raw materials are described below.

<Resin>
11: Polylactic acid resin (Nature Works 4032D, manufactured by Nature Works)
(Optical purity: 98.5%, weight-average molecular weight: 141,000, residual monomer: 1,200 ppm)
12: Polycarbonate resin (Panlite L-1250Y, manufactured by TEIJIN CHEMICALS LTD.)
(Crystallinity: 0%, glass transition temperature: 120° C.)

Examples 2-13 to 2-16 and Comparative Example 2-8

The pellets of the polylactic acid resin compositions (the products 2-I to 2-L of the present invention and the comparative product 2-c) obtained in Synthesis Example 2-3 were supplied into an injection molding machine (Mucell 85 ton, manufactured by The Japan Steel Works, Ltd.) set at a cylinder temperature of 220° C. for melting, while a supercritical fluid (carbon dioxide in a supercritical state) pressurized to 8 MPa was introduced through the gas inlet port provided at the cylinder section of the injection molding machine in the concentration shown in Table 19. The supercritical fluid was brought into contact with the polylactic acid resin composition in a melted state by kneading with the screw. The temperature inside the die attached to the tip of the injection molding machine was maintained at the temperature shown in Table 19, and the melted polylactic acid resin composition in contact with the carbon dioxide in a supercritical state was molded with injection-molding in this die at an injection pressure required for the molding as shown in Table 19, and retained therein until the crystallization was completed, to obtain a test piece (150 mm×30 mm×1 mm in thickness). The die retention time required for the release of the resultant test piece was evaluated in the same manner as in Example 2-1. The results are shown in Table 19.

Comparative Examples 2-9 to 2-12

In the same manner as in Example 2-13, except that the pellets of the polylactic acid resin compositions (the products 2-I to 2-L of the present invention) obtained in Synthesis Example 2-3 were used, carbon dioxide in a supercritical state was not introduced under the pressure, and the injection molding was performed at the die temperature shown in Table 19 at an injection pressure required for the molding as shown in Table 19, a test piece was obtained and the die retention time required for the release was evaluated in the same manner. The results are shown in Table 19.

TABLE 19

| | Resin Composition | Die Temp. (° C.) | Supercritical $CO_2$ Concentration*[1] (%) | Injection Pressure (MPa) | Die Retention Time Required for Release*[2] (s) |
|---|---|---|---|---|---|
| Examples | | | | | |
| 2-13 | 2-I | 80 | 2 | 98 | 23 |
| 2-14 | 2-J | 80 | 2 | 81 | 25 |
| 2-15 | 2-K | 80 | 2 | 72 | 26 |
| 2-16 | 2-L | 80 | 2 | 62 | 10 |
| Comparative Examples | | | | | |
| 2-8 | 2-c | 80 | 2 | 74 | 150 |
| 2-9 | 2-I | 80 | 0 | 120 | 60 |
| 2-10 | 2-J | 80 | 0 | 112 | 60 |
| 2-11 | 2-K | 80 | 0 | 95 | 60 |
| 2-12 | 2-L | 80 | 0 | 80 | 40 |

*[1]The concentration based on the polylactic acid resin composition.
*[2]Total of Time for Keeping Injection Pressure and Cooling Time (s).

It was found from the results shown in Table 19 that, also in a mixture system of the polylactic acid resin and another thermoplastic resin, as compared with Comparative Example 2-8 in which a metal salt of phenylphosphonic acid was not contained or Comparative Examples 2-9 to 2-12 in which the supercritical fluid was not brought into contact with the polylactic acid resin composition during the melt-kneading, the manufacturing method of the present invention enabled a remarkable reduction of the die retention time by the synergistic effect of the metal salt of phenylphosphonic acid and the supercritical fluid, resulting in an improvement in moldability by leaps and bounds. The lower the die temperature was, the more remarkable the effect was. It was also found that the injection pressure upon molding was decreased by bringing the supercritical fluid into contact with the polylactic acid resin composition during the melt-kneading.

Examples 2-17 to 2-20 and Comparative Example 2-13

In the same manner as in Example 2-13, except that the pellets of the polylactic acid resin compositions (the products 2-I to 2-L of the present invention and the comparative product 2-c) obtained in Synthesis Example 2-3 were used, and the die temperatures, the supercritical carbon dioxide concentrations and the die retention times shown in Table 20 were employed, the injection molding was performed. With respect to the resultant test pieces [a flat plate (70 mm×40 mm×3 mm) and a prism-shaped specimen (125 mm×12 mm×6 mm)], the bending test and thermal deformation temperature were evaluated in the same manner as in Example 2-5 for the prism-shaped specimen (125 mm×12 mm×6 mm), while the relative crystallinity, bleeding resistance and expansion ratio were evaluated in the same manner as in Example 2-5 for the flat plate (70 mm×40 mm×3 mm). The results are shown in Table 20.

TABLE 20

| | Resin Composition | Die Temp. (° C.) | Supercritical $CO_2$ Concentration*[1] (%) | Die Retention Time (s) | Die Releasability | Flexural Modulus (GPa) | Thermal Deformation Temp. (° C.) at 0.45 MPa | Relative Crystallinity (%) | Bleeding Resistance at 80° C. for one month | Expansion Ratio |
|---|---|---|---|---|---|---|---|---|---|---|
| Examples | | | | | | | | | | |
| 2-17 | 2-I | 80 | 2 | 23 | ○ | 3.6 | 110 | 100 | No Bleeding | 1.01 |
| 2-18 | 2-J | 80 | 2 | 25 | ○ | 4.0 | 122 | 100 | No Bleeding | 1.02 |
| 2-19 | 2-K | 80 | 2 | 26 | ○ | 4.2 | 125 | 100 | No Bleeding | 1.00 |
| 2-20 | 2-L | 80 | 2 | 10 | ○ | 1.8 | 90 | 100 | No Bleeding | 1.01 |
| Comparative Example | | | | | | | | | | |
| 2-13 | 2-c | 30 | 0 | 60 | Δ | 2.7 | 65 | 7 | No Bleeding | — |

*[1]The concentration based on the polylactic acid resin composition.

It was found from the results shown in Table 20 that the manufacturing method of the present invention enabled achievement of high crystallinity by the synergistic effect of the metal salt of phenylphosphonic acid and the supercritical fluid, and thus a polylactic acid resin injection molded article having excellent heat resistance was obtained.

In addition, also in a mixture system of the polylactic acid resin and another thermoplastic resin, the manufacturing method of the present invention enables achievement of satisfactory moldability without adding plasticizer, and high heat resistance is achieved by blending the polylactic acid having high crystallinity with another thermoplastic resin having high Tg. While, adding a plasticizer makes the rigidity lower, but the manufacturing method of the present invention enables achievement of satisfactory moldability while allowing for crystallization of polylactic acid without adding plasticizer, so that a polylactic acid resin molded article having high rigidity (flexural modulus) can be obtained (as can be seen that a polylactic acid resin molded article having a high rigidity is obtained in Examples 2-17 to 2-19 in comparison with Example 2-20).

Therefore, it is found that the manufacturing method of the present invention is an advantageous technique as compared with the technique of achieving satisfactory moldability while allowing for crystallization of polylactic acid by the addition of plasticizer in the field which requires a polylactic acid resin molded article containing another thermoplastic resin having high rigidity and high Tg to have higher heat resistance and higher rigidity.

Synthesis Example 2-4 of Polylactic Acid Resin Composition

As polylactic acid resin compositions, the raw materials of the products (2-M and 2-N) of the present invention shown in Table 21 were melt-kneaded at 190° C. in a twin screw extruder (PCM-45, manufactured by IKEGAI, Ltd.) and strand cut, to give pellets of the polylactic acid resin compositions. The resultant pellets were dried at 70° C. under reduced pressure for one day to a water content of 500 ppm or less.

TABLE 21

| Composition of Raw Materials | Products of the Present Invention | |
|---|---|---|
| Formulated (Parts by Weight) | 2-M | 2-N |
| Resin | | |
| U'z S-12*[1] | 100 | — |
| LACEA H-400*[2] | — | 100 |
| Organic Crystal Nucleus Agent | | |
| PPA-Zn*[3] | 0.5 | 0.5 |
| OHC18EB*[4] | 0.5 | 0.5 |

TABLE 21-continued

| Composition of Raw Materials | Products of the Present Invention | |
|---|---|---|
| Formulated (Parts by Weight) | 2-M | 2-N |
| Plasticizer | | |
| $(MeEO_3)2SA$*[5] | 5 | 5 |
| Hydrolysis Inhibitor | | |
| MCI*[6] | 1 | 1 |
| Inorganic Filler | | |
| Glass Fiber*[7] | 12 | 12 |
| Flame Retardant | | |
| $Al(OH)_3$*[8] | 120 | 120 |

Here, the raw materials in Table 21 represent the same as the raw materials in Table 12.

Examples 2-21 and 2-22

The pellets of the polylactic acid resin compositions (the products 2-M to 2-N of the present invention) obtained in Synthesis Example 2-4 were supplied into an injection molding machine (Mucell 85 ton, manufactured by The Japan Steel Works, Ltd.) set at a cylinder temperature of 200° C. for melting, while a supercritical fluid (carbon dioxide in a supercritical state) pressurized to 8 MPa was introduced through the gas inlet port provided at the cylinder section of the injection molding machine in the concentration shown in Table 22. The supercritical fluid was brought into contact with the polylactic acid resin composition in a melted state by kneading with the screw. The temperature inside the die attached to the tip of the injection molding machine was maintained at the temperature shown in Table 22, and the melted polylactic acid resin composition in contact with the carbon dioxide in a supercritical state was molded with injection-molding in this die at an injection pressure required for the molding as shown in Table 22, and retained therein until the crystallization was completed, to obtain a test piece (150 mm×30 mm×1 mm in thickness). The die retention time required for the release of the resultant test piece was evaluated in the same manner as in Example 2-1. The results are shown in Table 22.

TABLE 22

| Examples | Resin Composition | Die Temp. (° C.) | Supercritical $CO_2$ Concentration[*1] (%) | Injection Pressure (MPa) | Die Retention Time Required for Release[*2] (s) |
|---|---|---|---|---|---|
| 2-21 | 2-M | 80 | 1 | 45 | 25 |
|  |  | 70 |  | 47 | 27 |
| 2-22 | 2-N | 80 | 2 | 55 | 25 |
|  |  | 70 |  | 56 | 28 |

[*1]The concentration based on the polylactic acid resin composition.
[*2]Total of Time for Keeping Injection Pressure and Cooling Time (s).

It was found from the results shown in Table 22 that the manufacturing method of the present invention enabled a remarkable reduction of the die retention time by the synergistic effect of the metal salt of phenylphosphonic acid and the supercritical fluid, resulting in an improvement in moldability by leaps and bounds. The lower the die temperature was, the more remarkable the effect was. It was also found that the injection pressure upon molding was decreased by bringing the supercritical fluid into contact with the polylactic acid resin composition during the melt-kneading.

Synthesis Example 3-1 of Polylactic Acid Resin Composition

As polylactic acid resin compositions, the raw materials of the products (3-A to 3-G) of the present invention and the comparative product (3-a) shown in Table 23 were melt-kneaded at 190° C. in a twin screw extruder (PCM-45, manufactured by IKEGAI, Ltd.) and strand cut, to give pellets of the polylactic acid resin compositions. The resultant pellets were dried at 70° C. under reduced pressure for one day to a water content of 500 ppm or less.

TABLE 23

| Polylactic Acid Resin Composition (Parts by Weight) | Products of the Present Invention | | | | | | | Comparative Product |
|---|---|---|---|---|---|---|---|---|
|  | 3-A | 3-B | 3-C | 3-D | 3-E | 3-F | 3-G | 3-a |
| Polylactic Acid Resin |  |  |  |  |  |  |  |  |
| U'z S-12[*1] | 100 | 100 | 100 | 100 | 100 | — | — | 100 |
| U'z S-17[*2] | — | — | — | — | — | 100 | — | — |
| LACEA H-400[*3] | — | — | — | — | — | — | 100 | — |
| Organic Crystal Nucleus Agent |  |  |  |  |  |  |  |  |
| T-1287[*4] | 1 | — | — | — | 1 | 1 | 1 | — |
| XyStUre[*5] | — | 1 | — | — | — | — | — | — |
| 6-MeUra[*6] | — | — | 1 | — | — | — | — | — |
| MC-6000[*7] | — | — | — | 1 | — | — | — | — |
| Plasticizer |  |  |  |  |  |  |  |  |
| $(MeEO_3)2SA$[*8] | — | — | — | — | 10 | 12.5 | 5 | — |
| Hydrolysis Inhibitor |  |  |  |  |  |  |  |  |
| MCI[*9] | 1 | 1 | 1 | 1 | 1 | — | 1 | 1 |
| PCI[*10] | — | — | — | — | — | 1 | — | — |
| Inorganic Filler |  |  |  |  |  |  |  |  |
| Talc[*11] | — | — | — | — | — | 20 | — | — |
| Glass Fiber[*12] | — | — | — | — | — | — | 12 | — |
| Flame Retardant |  |  |  |  |  |  |  |  |
| $Al(OH)_3$[*13] | — | — | — | — | — | — | 120 | — |

Here, the raw materials in Table 23 represent as follows.

<Polylactic Acid Resin>
1: Polylactic acid resin (Eco Plastic U'zS-12, manufactured by TOYOTA MOTOR CORPORATION)
(Optical purity: 99.6%, weight-average molecular weight: 112,000, residual monomer: 173 ppm)
2: Polylactic acid resin (Eco Plastic U'zS-17, manufactured by TOYOTA MOTOR CORPORATION)
(Optical purity: 99.7%, weight-average molecular weight: 110,000, residual monomer: 327 ppm)
3: Polylactic acid resin (LACEA H-400, manufactured by Mitsui Chemicals, Inc.)
(Optical purity: 98.5%, weight-average molecular weight: 142,000, residual monomer: 1,200 ppm)

<Organic Crystal Nucleus Agent>
4: Decamethylene dicarbonyl dibenzoylhydrazide (T-1287, manufactured by ADEKA CORPORATION)
5: Xylylenebisstealylurea (Hakreen SX, manufactured by Nippon Kasei Chemical Co., Ltd.)
6: 6-methyluracil (reagent, manufactured by Wako Pure Chemical Industries, Ltd.)
7: Melamine cyanurate (MC-6000, manufactured by NISSAN CHEMICAL INDUSTRIES, LTD.)

<Plasticizer>
8: Diester of succinic acid and triethylene glycol monomethyl ether obtained in Synthesis Example 3-1 of Plasticizer described below <Hydrolysis Inhibitor>
9: Diisopropylphenyl carbodiimide (Stabaxol 1-LF, manufactured by Rhein Chemie Japan)
10: Poly(4,4'-dicyclohexylmethane carbodiimide) (CARBODILITE LA-1, manufactured by Nisshinbo Chemical, Inc.)

<Inorganic Filler>
11: Talc (MicroAce P-6, manufactured by Nippon Talc Co., Ltd.)
12: Glass fiber (ECS03T-187, manufactured by Nippon Electric Glass Co., Ltd.)

<Flame Retardant>
13: Aluminum hydroxide (BT703ST, Nippon Light Metal Co., Ltd.)

Synthesis Example 3-1 of Plasticizer

In a 3-L flask equipped with a stirrer, a thermometer and a dehydration tube, 500 g of succinic anhydride, 2,463 g of triethylene glycol monomethyl ether and 9.5 g of paratoluenesulfonic acid monohydrate were charged and the mixture was reacted under reduced pressure of 4 to 10.7 kPa at 110° C. for 15 hours, while blowing nitrogen (500 mL/minute) into the space. The acid value of the reaction solution was 1.6 (KOH mg/g). To the reaction solution, 27 g of an adsorbent Kyoward 500SH (manufactured by Kyowa Chemical Industry Co., Ltd.) was added, stirred at 80° C. at 2.7 kPa for 45 minutes, and filtered. Thereafter, triethylene glycol monomethyl ether was distilled off at a liquid temperature of 115 to 200° C. at a pressure of 0.03 kPa. After cooling to 80° C., the residual liquid was filtered under reduced pressure, to give a diester of succinic acid and triethylene glycol monomethyl ether as a filtrate. The resultant diester had an acid value of 0.2 (KOH mg/g), a saponification value of 276 (KOH mg/g), a hydroxyl value of 1 or less (KOH mg/g) and a hue of APHA200.

Examples 3-1 to 3-7 and Comparative Example 3-1

The pellets of the polylactic acid resin compositions (the products 3-A to 3-G of the present invention and the comparative product 3-a) obtained in Synthesis Example 3-1 were supplied into an injection molding machine (Mucell 85 ton, manufactured by The Japan Steel Works, Ltd.) set at a cylinder temperature of 200° C. for melting, while a supercritical fluid (carbon dioxide in a supercritical state) pressurized to 8 MPa was introduced through the gas inlet port provided at the cylinder section of the injection molding machine in the concentration shown in Table 24. The supercritical fluid was brought into contact with the polylactic acid resin composition in a melted state by kneading with the screw. The temperature inside the die attached to the tip of the injection molding machine was maintained at the temperature shown in Table 24, and the melted polylactic acid resin composition in contact with the carbon dioxide in a supercritical state was molded with injection-molding in this die at an injection pressure required for the molding as shown in Table 24, and retained therein until the crystallization was completed, to obtain a test piece (150 mm×30 mm×1 mm in thickness). The die retention time required for the release of the resultant test piece was evaluated by the following criteria. The results are shown in Table 24.

<Evaluation Criteria for Die Retention Time Required for Release>

The time taken to be decided that each test piece was not deformed and was easily taken out under the molding conditions shown in Table 24 was defined as the die retention time required for the release. Here, the higher the rates of melt crystallization of the test piece inside the die and at the runner part, the shorter the die retention time required for the release.

Comparative Examples 3-2 to 3-5

In the same manner as in Example 3-1, except that the pellets of the polylactic acid resin compositions (the products 3-A to 3-D of the present invention) obtained in Synthesis Example 3-1 were used, carbon dioxide in a supercritical state was not introduced under the pressure, and the injection molding was performed at the die temperature shown in Table 24 at an injection pressure required for the molding as shown in Table 24, a test piece was obtained and the die retention time required for the release was evaluated in the same manner. The results are shown in Table 24.

TABLE 24

|  | Resin Composition | Die Temp. (° C.) | Supercritical $CO_2$ Concentration[*1] (%) | Injection Pressure (MPa) | Die Retention Time Required for Release[*2] (s) |
|---|---|---|---|---|---|
| Examples |  |  |  |  |  |
| 3-1 | 3-A | 80 | 2 | 55 | 50 |
|  |  | 70 |  | 58 | 60 |
| 3-2 | 3-B | 80 | 2 | 57 | 55 |
| 3-3 | 3-C | 80 | 2 | 58 | 60 |
| 3-4 | 3-D | 80 | 2 | 56 | 60 |
| 3-5 | 3-E | 80 | 2 | 38 | 20 |
|  |  | 70 |  | 39 | 25 |

TABLE 24-continued

|  | Resin Composition | Die Temp. (° C.) | Supercritical $CO_2$ Concentration[*1] (%) | Injection Pressure (MPa) | Die Retention Time Required for Release[*2] (s) |
|---|---|---|---|---|---|
| 3-6 | 3-F | 70 | 5 | 32 | 20 |
| 3-7 | 3-G | 80 | 1 | 64 | 30 |
| Comparative Examples | | | | | |
| 3-1 | 3-a | 80 | 2 | 58 | 180 |
|  |  | 70 |  | 60 | 300 |
| 3-2 | 3-A | 80 | 0 | 78 | 180 |
|  |  | 70 |  | 92 | 280 |
| 3-3 | 3-B | 80 | 0 | 80 | 200 |
| 3-4 | 3-C | 80 | 0 | 79 | 200 |
| 3-5 | 3-D | 80 | 0 | 78 | 210 |

[*1] The concentration based on the polylactic acid resin composition.
[*2] Total of Time for Keeping Injection Pressure and Cooling Time (s).

It was found from the results shown in Table 24 that, as compared with Comparative Example 3-1 in which the organic crystal nucleus agent of the present invention was not contained or Comparative Examples 3-2 to 3-5 in which the supercritical fluid was not brought into contact with the polylactic acid resin composition during the melt-kneading, the manufacturing method of the present invention enabled a remarkable reduction of the die retention time by the synergistic effect of the organic crystal nucleus agent of the present invention and the supercritical fluid, resulting in an improvement in moldability by leaps and bounds. The lower the die temperature was, the more remarkable the effect was. It was also found that the injection pressure upon molding was decreased by bringing the supercritical fluid into contact with the polylactic acid resin composition during the melt-kneading.

Examples 3-8 to 3-10 and Comparative Example 3-6

In the same manner as in Example 3-1, except that the pellets of the polylactic acid resin compositions (the products 3-A, 3-E, and 3-F of the present invention and the comparative product 3-a) obtained in Synthesis Example 3-1 were used, and the die temperatures, the supercritical carbon dioxide concentrations and the die retention times shown in Table 25 were employed, the injection molding was performed. With respect to the resultant test pieces [a flat plate (70 mm×40 mm×3 mm) and a prism-shaped specimen (125 mm×12 mm×6 mm)], the bending test and thermal deformation temperature were evaluated by the following methods for the prism-shaped specimen (125 mm×12 mm×6 mm), while the relative crystallinity, bleeding resistance and expansion ratio were evaluated by the following methods for the flat plate (70 mm×40 mm×3 mm). The results are shown in Table 25.

<Criteria for Evaluation of Die Releasability>
A: The test piece is not deformed and is easily taken out.
B: The test piece is slightly deformed and difficult to be taken out.
C: The test piece is largely deformed and is not released from the runner part.

Here, with respect to the mold releasability, the higher the rates of melt crystallization of the test piece inside the die and at the runner part, the more satisfactory the moldability.

<Bending Test (Rigidity)>
For the prism-shaped specimen (125 mm×12 mm×6 mm), a bending test was performed according to JIS K7203 using Tensilon (Tensilon universal testing machine RTC-1210A, manufactured by Orientec Co., Ltd.) to determine a flexural modulus. The crosshead speed was 3 mm/min. The higher flexural moduli show more excellent rigidities.

<Thermal Deformation Temperature (Heat Resistance)>
For the prism-shaped specimen (125 mm×12 mm×6 mm), the temperature was measured at which the specimen was deflected by 0.025 mm under a load of 0.45 MPa, according to JIS-K7207 using a thermal deformation temperature measuring device (B-32, manufactured by Toyo Seiki Seisakusho, Ltd.). The higher temperatures show more excellent heat resistances.

<Impact Resistance>
For the prism-shaped specimen (63 mm×12 mm×5 mm), the Izod impact strength was measured according to JIS-K7110 using an impact testing machine (863-type, manufactured by Ueshima Seisakusho Co., Ltd.). The higher strengthen show more excellent impact resistances.

<Relative Crystallinity>
The test piece of the flat plate (70 mm×40 mm×3 mm) after the injection molding was crushed. After accurately weighing 7.0 to 8.0 mg of the crushed test piece, the crushed test piece was enclosed in an aluminum pan. Thereafter, using a DSC apparatus (Diamond DSC, manufactured by PerkinElmer), as the 1st RUN, the temperature was raised from 20° C. to 200° C. at a temperature rise rate of 20° C./minute, maintained at 200° C. for 5 minutes, then dropped from 200° C. to 20° C. at a temperature drop rate of −20° C./minute and maintained at 20° C. for one minute. Subsequently, as the 2nd RUN, the temperature was raised from 20° C. to 200° C. at a temperature rise rate of 20° C./minute. The absolute value ΔHcc of the cold crystallization enthalpy of polylactic acid resin observed in the 1st RUN, and the crystal melt enthalpy ΔHm observed in the 2nd RUN were determined, and the values obtained was used to determine the relative crystallinity (%) by the following equation.

$$\text{Relative Crystallinity (\%)} = \{(\Delta Hm - \Delta Hcc)/\Delta Hm\} \times 100$$

<Bleeding Resistance>
The flat plate (70 mm×40 mm×3 mm) after the injection molding was allowed to stand in an oven at 80° C. for one month, and visually observed for the absence or presence of bleeding of the organic crystal nucleus agent and/or the plasticizer on the surface.

<Expansion Ratio>
The expansion ratio was determined by the following equation.

$$\text{Expansion Ratio} = \text{(Density of Molded Article Subjected to Injection Molding Without Using Supercritical Fluid)/(Density of Molded Article Subjected to Injection Molding Using Supercritical Fluid)}$$

Here, the density of the molded article was determined according to JIS K-7112 (Method B: Pycnometer Method).

the addition of plasticizer in the field which requires a polylactic acid resin molded article having high rigidity.

TABLE 25

| | Resin Composition | Die Temp. (° C.) | Supercritical $CO_2$ Concentration*[1] (%) | Die Retension Time (s) | Die Releasability | Flexural Modulus (GPa) | Thermal Deformation Temp. (° C.) at 0.45 MPa | Impact Resistance (J/m) | Relative Crystallinity (%) | Bleeding Resistance at 80° C. for one month | Expansion Ratio |
|---|---|---|---|---|---|---|---|---|---|---|---|
| Examples | | | | | | | | | | | |
| 3-8 | 3-A | 80 | 2 | 50 | A | 4.6 | 83 | 51 | 100 | No Bleeding | 1.01 |
| 3-9 | 3-E | 80 | 2 | 20 | A | 1.2 | 72 | 129 | 100 | No Bleeding | 1.01 |
| 3-10 | 3-F | 70 | 5 | 20 | A | 2.4 | 115 | 47 | 100 | No Bleeding | 1.00 |
| Comparative Example | | | | | | | | | | | |
| 3-6 | 3-a | 30 | 0 | 60 | B | 3.3 | 52 | 22 | 5 | No Bleeding | — |

*[1]The concentration based on the polylactic acid resin composition.

It was found from the results shown in Table 25 that the manufacturing method of the present invention enabled achievement of high crystallinity by the synergistic effect of the organic crystal nucleus agent of the present invention and the supercritical fluid, and thus a polylactic acid resin injection molded article having excellent heat resistance was obtained.

In addition, the manufacturing method of the present invention enables achievement of satisfactory moldability without adding plasticizer. While, adding a plasticizer makes the rigidity lower, but the manufacturing method of the present invention enables achievement of satisfactory moldability without adding plasticizer, so that a polylactic acid resin molded article having high rigidity (flexural modulus) can be obtained (as can be seen that a polylactic acid resin molded article having a high rigidity is obtained in Example 3-8 in comparison with Examples 3-9 and 3-10).

Therefore, it is found that the manufacturing method of the present invention is an advantageous technique as compared with the technique of achieving satisfactory moldability by the addition of plasticizer in the field which requires a polylactic acid resin molded article having high rigidity.

Synthesis Example 3-2 of Polylactic Acid Resin Composition

As polylactic acid resin compositions, the raw materials of the products (3-H to 3-N) of the present invention and the comparative product (3-b) shown in Table 26 were melt-kneaded at 230° C. in a twin screw extruder (PCM-45, manufactured by IKEGAI, Ltd.) and strand cut, to give pellets of the polylactic acid resin compositions. The resultant pellets were dried in a dehumidification dryer at 80° C. for 5 hours to a water content of 500 ppm or less.

TABLE 26

| Polylactic Acid Resin Composition | Products of the Present Invention | | | | | | | Comparative Product |
|---|---|---|---|---|---|---|---|---|
| (Parts by Weight) | 3-H | 3-I | 3-J | 3-K | 3-L | 3-M | 3-N | 3-b |
| Resin | | | | | | | | |
| Poly-L-Lactic Acid Resin*[14] | 50 | 50 | 50 | 50 | 50 | 50 | 50 | 50 |
| Poly-D-Lactic Acid Resin*[15] | 50 | 50 | 50 | 50 | 50 | 50 | 50 | 50 |
| Organic Crystal Nucleus Agent | | | | | | | | |
| T-1287*[4] | 1 | — | — | — | 1 | 1 | 1 | — |
| XyStUre*[5] | — | 1 | — | — | — | — | — | — |
| 6-MeUra*[6] | — | — | 1 | — | — | — | — | — |
| MC-6000*[7] | — | — | — | 1 | — | — | — | — |
| Plasticizer | | | | | | | | |
| $(MeEO_3)2SA$*[8] | — | — | — | — | 10 | 12.5 | 5 | — |
| Hydrolysis Inhibitor | | | | | | | | |
| MCI*[9] | 1 | 1 | 1 | 1 | 1 | — | 1 | 1 |
| PCI*[10] | — | — | — | — | — | 1 | — | — |
| Inorganic Filler | | | | | | | | |
| Talc*[11] | — | — | — | — | — | 20 | — | — |
| Glass Fiber*[12] | — | — | — | — | — | — | 12 | — |
| Flame Retardant | | | | | | | | |
| $Al(OH)_3$*[13] | — | — | — | — | — | — | 120 | — |

Here, the raw materials in Table 26 represent the same as the raw materials in Table 23, and the other raw materials are described below.

<Polylactic Acid Resin>

14: Polylactic acid resin (poly-L-lactic acid resin) obtained in Synthesis Example 3-4 of Polylactic Acid Resin described below 15: Polylactic acid resin (poly-D-lactic acid resin) obtained in Synthesis Example 3-2 of Polylactic Acid Resin described below

Synthesis Example 3-1 of Polylactic Acid Resin (Production of Poly-L-lactic Acid Resin)

To 100 parts by weight of L-lactide (manufactured by Musashino Chemical Laboratory, Ltd., optical purity: 100%), 0.005 parts by weight of tin octylate was added. The mixture was reacted under a nitrogen atmosphere in a reactor having an agitating blade at 180° C. for 2 hours, subsequently placed under reduced pressure to remove the remaining lactide, and made into chips to obtain poly-L-lactic acid. The resultant poly-L-lactic acid had a weight-average molecular weight of 110,000, a glass transition temperature (Tg) of 60° C. and a melting point of 166° C.

Synthesis Example 3-2 of Polylactic Acid Resin (Production of Poly-D-lactic Acid Resin)

To 100 parts by weight of D-lactide (manufactured by Musashino Chemical Laboratory, Ltd., optical purity: 100%), 0.005 parts by weight of tin octylate was added. The mixture was reacted under a nitrogen atmosphere in a reactor having an agitating blade at 180° C. for 2 hours, subsequently placed under reduced pressure to remove the remaining lactide, and made into chips to obtain poly-D-lactic acid. The resultant poly-D-lactic acid had a weight-average molecular weight of 110,000, a glass transition temperature (Tg) of 60° C. and a melting point of 167° C.

cylinder section of the injection molding machine in the concentration shown in Table 27. The supercritical fluid was brought into contact with the polylactic acid resin composition in a melted state by kneading with the screw. The temperature inside the die attached to the tip of the injection molding machine was maintained at the temperature shown in Table 27, and the melted polylactic acid resin composition in contact with the carbon dioxide in a supercritical state was molded with injection-molding in this die at an injection pressure required for the molding as shown in Table 27, and retained therein until the crystallization was completed, to obtain a test piece (150 mm×30 mm×1 mm in thickness). The die retention time required for the release of the resultant test piece was evaluated in the same manner as in Example 3-1. The results are shown in Table 27.

Comparative Examples 3-8 to 3-11

In the same manner as in Example 3-11, except that the pellets of the polylactic acid resin compositions (the products 3-H to 3-K of the present invention) obtained in Synthesis Example 3-2 were used, carbon dioxide in a supercritical state was not introduced under the pressure, and the injection molding was performed at the die temperature shown in Table 27 at an injection pressure required for the molding as shown in Table 27, a test piece was obtained and the die retention time required for the release was evaluated in the same manner. The results are shown in Table 27.

TABLE 27

|  | Resin Composition | Die Temp. (° C.) | Supercritical $CO_2$ Concentration*[1] (%) | Injection Pressure (MPa) | Die Retention Time Required for Release*[2] (s) |
|---|---|---|---|---|---|
| Examples |  |  |  |  |  |
| 3-11 | 3-H | 80 | 2 | 57 | 40 |
|  |  | 70 |  | 59 | 55 |
| 3-12 | 3-I | 80 | 2 | 58 | 45 |
| 3-13 | 3-J | 80 | 2 | 57 | 50 |
| 3-14 | 3-K | 80 | 2 | 56 | 50 |
| 3-15 | 3-L | 80 | 2 | 42 | 17 |
|  |  | 70 | 2 | 41 | 20 |
| 3-16 | 3-M | 70 | 5 | 35 | 15 |
| 3-17 | 3-N | 80 | 1 | 64 | 25 |
| Comparative Examples |  |  |  |  |  |
| 3-7 | 3-b | 80 | 2 | 61 | 150 |
|  |  | 70 |  | 62 | 270 |
| 3-8 | 3-H | 80 | 0 | 78 | 150 |
|  |  | 70 |  | 92 | 250 |
| 3-9 | 3-I | 80 | 0 | 80 | 180 |
| 3-10 | 3-J | 80 | 0 | 79 | 180 |
| 3-11 | 3-K | 80 | 0 | 78 | 190 |

*[1]The concentration based on the polylactic acid resin composition.
*[2]Total of Time for Keeping Injection Pressure and Cooling Time (s).

Examples 3-11 to 3-17 and Comparative Example 3-7

The pellets of the polylactic acid resin compositions (the products 3-H to 3-N of the present invention and the comparative product 3-b) obtained in Synthesis Example 3-2 were supplied into an injection molding machine (Mucell 85 ton, manufactured by The Japan Steel Works, Ltd.) set at a cylinder temperature of 230° C. for melting, while a supercritical fluid (carbon dioxide in a supercritical state) pressurized to 8 MPa was introduced through the gas inlet port provided at the It was found from the results shown in Table 27 that, also in a stereocomplex polylactic acid resin, as compared with Comparative Example 3-7 in which the organic crystal nucleus agent of the present invention was not contained or Comparative Examples 3-8 to 3-11 in which the supercritical fluid was not brought into contact with the polylactic acid resin composition during the melt-kneading, the manufacturing method of the present invention enabled a remarkable reduction of the die retention time by the synergistic effect of the organic crystal nucleus agent of the present invention and the supercritical fluid, resulting in an improvement in moldability by leaps and bounds. The lower the die temperature was, the more remarkable the effect was. It was also found that the injection pressure upon molding was decreased by bringing the supercritical fluid into contact with the polylactic acid resin composition during the melt-kneading.

Examples 3-18 to 3-20 and Comparative Example 3-12

In the same manner as in Example 3-11, except that the pellets of the polylactic acid resin compositions (the products 3-H, 3-L, and 3-M of the present invention and the comparative product 3-b) obtained in Synthesis Example 3-2 were used, the die temperatures, the supercritical carbon dioxide concentrations and the die retention times shown in Table 28 were employed, the injection molding was performed. With respect to the resultant test pieces [a flat plate (70 mm×40 mm×3 mm) and a prism-shaped specimen (125 mm×12 mm×6 mm)], the bending test and thermal deformation temperature were evaluated in the same manner as in Example 3-8 for the prism-shaped specimen (125 mm×12 mm×6 mm), while the relative crystallinity, bleeding resistance and expansion ratio were evaluated in the same manner as in Example 3-8 for the flat plate (70 mm×40 mm×3 mm). The results are shown in Table 28.

Synthesis Example 3-3 of Polylactic Acid Resin Composition

As polylactic acid resin compositions, the products (3-O to 3-R) of the present invention and the comparative product (3-c) shown in Table 29 were melt-kneaded at 240° C. in a twin screw extruder (PCM-45, manufactured by IKEGAI, Ltd.) and strand cut, to give pellets of the polylactic acid resin compositions. The resultant pellets were dried in a dehumidification dryer at 80° C. for 5 hours to a water content of 500 ppm or less.

TABLE 29

| Composition of Raw Materials | the Present Invention | | | | Comparative Product |
|---|---|---|---|---|---|
| Formulated (Parts by Weight) | 3-O | 3-P | 3-Q | 3-R | 3-c |
| Resin | | | | | |
| Poly-L-Lactic Acid Resin*[15] | 50 | 70 | 80 | 70 | 70 |
| Polycarbonate Resin*[16] | 50 | 30 | 20 | 30 | 30 |

TABLE 28

| | Resin Composition | Die Temp. (° C.) | Supercritical $CO_2$ Concentration*[1] (%) | Die Rentension Time (s) | Die Re-leasability | Flexural Modulus (GPa) | Thermal Deformation Temp. (° C.) at 0.45 MPa | Relative Crystallinity (%) | Bleeding Resistance at 80° C. for one month | Expansion Ratio |
|---|---|---|---|---|---|---|---|---|---|---|
| Examples | | | | | | | | | | |
| 3-18 | 3-H | 80 | 2 | 40 | A | 4.7 | 84 | 100 | No Bleeding | 1.02 |
| 3-19 | 3-L | 80 | 2 | 17 | A | 1.3 | 71 | 100 | No Bleeding | 1.00 |
| 3-20 | 3-M | 70 | 5 | 15 | A | 2.4 | 113 | 100 | No Bleeding | 1.00 |
| Comparative Example | | | | | | | | | | |
| 3-12 | 3-b | 30 | 0 | 60 | B | 3.3 | 52 | 5 | No Bleeding | 1.00 |

*[1]The concentration based on the polylactic acid resin composition.

It was found from the results shown in Table 28 that the manufacturing method of the present invention enabled achievement of high crystallinity by the synergistic effect of the organic crystal nucleus agent of the present invention and the supercritical fluid, and thus a polylactic acid resin injection molded article having excellent heat resistance was obtained.

In addition, also in a stereocomplex polylactic acid resin, the manufacturing method of the present invention enables achievement of satisfactory moldability without adding plasticizer. While, adding a plasticizer makes the rigidity lower, but the manufacturing method of the present invention enables achievement of satisfactory moldability without adding plasticizer, so that a stereocomplex polylactic acid resin molded article having high rigidity (flexural modulus) can be obtained (as can be seen that a polylactic acid resin molded article having a high rigidity is obtained in Example 3-18 in comparison with Examples 3-19 and 3-20).

Therefore, it is found that the manufacturing method of the present invention is an advantageous technique as compared with the technique of achieving satisfactory moldability by the addition of plasticizer in the field which requires a stereocomplex polylactic acid resin molded article having high rigidity.

TABLE 29-continued

| Composition of Raw Materials | the Present Invention | | | | Comparative Product |
|---|---|---|---|---|---|
| Formulated (Parts by Weight) | 3-O | 3-P | 3-Q | 3-R | 3-c |
| Organic Crystal Nucleus Agent | | | | | |
| T1287*[4] | 0.5 | 0.7 | 0.8 | 0.7 | — |
| Plasticizer | | | | | |
| (MeEO$_3$)2SA*[7] | — | — | — | 7 | — |
| Hydrolysis Inhibitor | | | | | |
| MCI*[8] | 1 | 1 | 1 | 1 | 1 |
| PCI*[9] | — | — | — | — | — |
| Inorganic Filler | | | | | |
| Talc*[10] | — | — | — | — | — |
| Glass Fiber*[11] | — | — | — | — | — |
| Flame Retardant | | | | | |
| Al(OH)$_3$*[12] | — | — | — | — | — |

Here, the raw materials in Table 29 represent the same as the raw materials in Table 23, and the other raw materials are described below.

\<Resin\>
15: Polylactic acid resin (Nature Works 4032D, manufactured by Nature Works)
(Optical purity: 98.5%, weight-average molecular weight: 141,000, residual monomer: 1,200 ppm)

16: Polycarbonate resin (Panlite L-1250Y, manufactured by TEIJIN CHEMICALS LTD.)

(Crystallinity: 0%, glass transition temperature: 120° C.)

Examples 3-21 to 3-24 and Comparative Example 3-13

The pellets of the polylactic acid resin compositions (the products 3-O to 3-R of the present invention and the comparative product 3-c) obtained in Synthesis Example 3-3 were supplied into an injection molding machine (Mucell 85 ton, manufactured by The Japan Steel Works, Ltd.) set at a cylinder temperature of 220° C. for melting, while a supercritical fluid (carbon dioxide in a supercritical state) pressurized to 8 MPa was introduced through the gas inlet port provided at the cylinder section of the injection molding machine in the concentration shown in Table 30. The supercritical fluid was brought into contact with the polylactic acid resin composition in a melted state by kneading with the screw. The temperature inside the die attached to the tip of the injection molding machine was maintained at the temperature shown in Table 30, and the melted polylactic acid resin composition in contact with the carbon dioxide in a supercritical state was molded with injection-molding in this die at an injection pressure required for the molding as shown in Table 30, and retained therein until the crystallization was completed, to obtain a test piece (150 mm×30 mm×1 mm in thickness). The die retention time required for the release of the resultant test piece was evaluated in the same manner as in Example 3-1. The results are shown in Table 30.

Comparative Examples 3-14 to 3-17

In the same manner as in Example 3-21, except that the pellets of the polylactic acid resin compositions (the products 3-O to 3-R of the present invention) obtained in Synthesis Example 3-3 were used, carbon dioxide in a supercritical state was not introduced under the pressure, and the injection molding was performed at the die temperature shown in Table 30 at an injection pressure required for the molding as shown in Table 30, a test piece was obtained and the die retention time required for the release was evaluated in the same manner. The results are shown in Table 30.

TABLE 30

|  | Resin Composition | Die Temp. (° C.) | Supercritical $CO_2$ Concentration*[1] (%) | Injection Pressure (MPa) | Die Retention Time Required for Release*[2] (s) |
| --- | --- | --- | --- | --- | --- |
| Examples | | | | | |
| 3-21 | 3-O | 80 | 2 | 100 | 50 |
| 3-22 | 3-P | 80 | 2 | 80 | 52 |
| 3-23 | 3-Q | 80 | 2 | 72 | 55 |
| 3-24 | 3-R | 80 | 2 | 60 | 20 |
| Comparative Examples | | | | | |
| 3-13 | 3-c | 80 | 2 | 72 | 150 |
| 3-14 | 3-O | 80 | 0 | 121 | 150 |
| 3-15 | 3-P | 80 | 0 | 110 | 150 |
| 3-16 | 3-Q | 80 | 0 | 97 | 155 |
| 3-17 | 3-R | 80 | 0 | 80 | 70 |

*[1]The concentration based on the polylactic acid resin composition.
*[2]Total of Time for Keeping Injection Pressure and Cooling Time (s).

It was found from the results shown in Table 30 that, also in a mixture system of the polylactic acid resin and another thermoplastic resin, as compared with Comparative Example 3-13 in which the organic crystal nucleus agent of the present invention was not contained or Comparative Examples 3-14 to 3-17 in which the supercritical fluid was not brought into contact with the polylactic acid resin composition during the melt-kneading, the manufacturing method of the present invention enabled a remarkable reduction of the die retention time by the synergistic effect of the organic crystal nucleus agent of the present invention and the supercritical fluid, resulting in an improvement in moldability by leaps and bounds. The lower the die temperature was, the more remarkable the effect was. It was also found that the injection pressure upon molding was decreased by bringing the supercritical fluid into contact with the polylactic acid resin composition during the melt-kneading.

Examples 3-25 to 3-28 and Comparative Example 3-18

In the same manner as in Example 3-21, except that the pellets of the polylactic acid resin compositions (the products 3-O to 3-R of the present invention and the comparative product 3-c) obtained in Synthesis Example 3-3 were used, and the die temperatures, the supercritical carbon dioxide concentrations and the die retention times shown in Table 31 were employed, the injection molding was performed. With respect to the resultant test pieces [a flat plate (70 mm×40 mm×3 mm) and a prism-shaped specimen (125 mm×12 mm×6 mm)], the bending test and thermal deformation temperature were evaluated in the same manner as in Example 3-8 for the prism-shaped specimen (125 mm×12 mm×6 mm), while the relative crystallinity, bleeding resistance and expansion ratio were evaluated in the same manner as in Example 3-8 for the flat plate (70 mm×40 mm×3 mm). The results are shown in Table 31.

tion molded article having excellent heat resistance was obtained.

In addition, also in a mixture system of the polylactic acid resin and another thermoplastic resin, the manufacturing method of the present invention enables achievement of satisfactory moldability without adding plasticizer, and high heat resistance is achieved by blending the polylactic acid having high crystallinity with another thermoplastic resin having high Tg. While, adding a plasticizer makes the rigidity lower, but the manufacturing method of the present invention enables achievement of satisfactory moldability while allowing for crystallization of polylactic acid without adding plasticizer, so that a polylactic acid resin molded article having high rigidity (flexural modulus) can be obtained (as can be seen that a polylactic acid resin molded article having a high rigidity is obtained in Examples 3-25 to 3-27 in comparison with Example 3-28).

Therefore, it is found that the manufacturing method of the present invention is an advantageous technique as compared with the technique of achieving satisfactory moldability while allowing for crystallization of polylactic acid by the addition of plasticizer in the field which requires a polylactic acid resin molded article containing another thermoplastic resin having high rigidity and high Tg to have higher heat resistance and higher rigidity.

Synthesis Example 4-1 of Polylactic Acid Resin Composition

As polylactic acid resin compositions, the raw materials of the products (4-A to 4-P) of the present invention and the

TABLE 31

| | Resin Composition | Die Temp. (° C.) | Supercritical $CO_2$ Concentration*[1] (%) | Die Retention Time (s) | Die Releasability | Flexural Modulus (GPa) | Thermal Deformation Temp. (° C.) at 0.45 MPa | Relative Crystallinity (%) | Bleeding Resistance at 80° C. for one month | Expansion Ratio |
|---|---|---|---|---|---|---|---|---|---|---|
| Examples | | | | | | | | | | |
| 3-25 | 3-O | 80 | 2 | 50 | A | 3.7 | 110 | 100 | No Bleeding | 1.00 |
| 3-26 | 3-P | 80 | 2 | 52 | A | 3.9 | 121 | 100 | No Bleeding | 1.02 |
| 3-27 | 3-Q | 80 | 2 | 55 | A | 4.1 | 123 | 100 | No Bleeding | 1.00 |
| 3-28 | 3-R | 80 | 2 | 20 | A | 1.9 | 90 | 100 | No Bleeding | 1.01 |
| Comparative Example | | | | | | | | | | |
| 3-18 | 3-c | 30 | 0 | 60 | B | 2.7 | 65 | 7 | No Bleeding | 1.00 |

*[1]The concentration based on the polylactic acid resin composition.

It was found from the results shown in Table 31 that the manufacturing method of the present invention enabled achievement of high crystallinity by the synergistic effect of the organic crystal nucleus agent of the present invention and the supercritical fluid, and thus a polylactic acid resin injection molded article having excellent heat resistance was comparative product (4-a) shown in Table 32 were melt-kneaded at 190° C. in a twin screw extruder (PCM-45, manufactured by IKEGAI, Ltd.) and strand cut, to give pellets of the polylactic acid resin compositions. The resultant pellets were dried at 70° C. under reduced pressure for one day to a water content of 500 ppm or less.

TABLE 32

| Polylactic Acid Resin Composition (Parts by Weight) | Products of the Present Invention (4-A to 4-P) | | | | | | | | | | | | | | | | Comparative Product |
|---|---|---|---|---|---|---|---|---|---|---|---|---|---|---|---|---|---|
| | A | B | C | D | E | F | G | H | I | J | K | L | M | N | O | P | 4-a |
| Polylactic Acid Resin | | | | | | | | | | | | | | | | | |
| U'zS-12*1 | 100 | 100 | 100 | 100 | 100 | 100 | 100 | 100 | 100 | 100 | 100 | 100 | 100 | 100 | — | — | 100 |
| U'zS-17*2 | — | — | — | — | — | — | — | — | — | — | — | — | — | — | 100 | — | — |
| LACEAH-400*3 | — | — | — | — | — | — | — | — | — | — | — | — | — | — | — | 100 | — |
| Organic Crystal Nucleus Agent | | | | | | | | | | | | | | | | | |
| PY109*4 | 0.5 | — | — | — | — | — | — | — | — | — | — | — | — | — | — | — | — |
| PY110*5 | — | 0.5 | — | — | — | — | — | — | — | — | — | — | — | — | — | — | — |
| PR272*6 | — | — | 0.5 | — | — | — | — | — | — | — | — | — | — | — | — | — | — |
| PR254(1)*7 | — | — | — | 0.5 | — | — | — | — | — | — | — | — | — | — | — | — | — |
| PR254(2)*8 | — | — | — | — | 0.5 | — | — | — | — | — | — | — | 0.5 | 0.5 | — | — | — |
| PV32*9 | — | — | — | — | — | 0.5 | — | — | — | — | — | — | — | — | — | — | — |
| PR185*10 | — | — | — | — | — | — | 0.5 | — | — | — | — | — | — | — | — | — | — |
| PR208*11 | — | — | — | — | — | — | — | 0.5 | — | — | — | — | — | — | — | — | — |
| PB15:3*13 | — | — | — | — | — | — | — | — | 0.5 | — | — | — | — | — | 0.5 | 0.5 | — |
| PB15*14 | — | — | — | — | — | — | — | — | — | 0.5 | — | — | — | — | — | — | — |
| PB15:6*15 | — | — | — | — | — | — | — | — | — | — | 0.5 | — | — | — | — | — | — |
| Vat Blue 1*12 | — | — | — | — | — | — | — | — | — | — | — | 0.5 | — | — | — | — | — |
| OHC18EB*16 | — | — | — | — | — | — | — | — | — | — | — | — | 0.5 | 0.5 | — | — | — |
| Plasticizer | | | | | | | | | | | | | | | | | |
| (MeEO$_3$)2SA*17 Hydrolysis Inhibitor | — | — | — | — | — | — | — | — | — | — | — | — | — | 10 | 12.5 | 5 | — |
| MCI*18 | 1 | 1 | 1 | 1 | 1 | 1 | 1 | 1 | 1 | 1 | 1 | 1 | 1 | 1 | — | 1 | 1 |
| PCI*19 | — | — | — | — | — | — | — | — | — | — | — | — | — | — | 1 | — | — |
| Inorganic Filler | | | | | | | | | | | | | | | | | |
| Talc*20 | — | — | — | — | — | — | — | — | — | — | — | — | — | 20 | — | — | — |
| Glass Fiber*21 | — | — | — | — | — | — | — | — | — | — | — | — | — | — | — | 12 | — |
| Flame Retardant | | | | | | | | | | | | | | | | | |
| Al(OH)$_3$*22 | — | — | — | — | — | — | — | — | — | — | — | — | — | — | — | 120 | — |

Here, the raw materials in Table 32 represent as follows.

<Polylactic Acid Resin>

1: Polylactic acid resin (Eco Plastic U'zS-12, manufactured by TOYOTA MOTOR CORPORATION)
(Optical purity: 99.6%, weight-average molecular weight: 112,000, residual monomer: 173 ppm)

2: Polylactic acid resin (Eco Plastic U'zS-17, manufactured by TOYOTA MOTOR CORPORATION)
(Optical purity: 99.7%, weight-average molecular weight: 110,000, residual monomer: 327 ppm)

3: Polylactic acid resin (LACEA H-400, manufactured by Mitsui Chemicals, Inc.)
(Optical purity: 98.5%, weight-average molecular weight: 142,000, residual monomer: 1,200 ppm)

<Organic Pigment>

(a) Cyclic compound having a functional group selected from C=O, NH and O in the molecule 4: PY109 (IRGAZIN Yellow 2GLTE, manufactured by CHIBA FINE CHEMICAL CO., LTD., specific surface area: 30 m$^2$/g, volume-based median particle size: 0.18 μm)

5: PY110 (CROMOPHTAL Yellow 2RLP, manufactured by CHIBA FINE CHEMICAL CO., LTD., specific surface area: 49 m$^2$/g, volume-based median particle size: 0.1 μm)

6: PR272 (CROMOPHTAL DPP Flame Red FP, manufactured by CHIBA FINE CHEMICAL CO., LTD., specific surface area: 26 m$^2$/g, volume-based median particle size: 0.3 μm)

7: PR254(1) (CROMOPHTAL DPP Red RP, manufactured by CHIBA FINE CHEMICAL CO., LTD., specific surface area: 29 m$^2$/g, volume-based median particle size: 0.2 μm)

8: PR254(2) (IRGAZIN DPP Red BTR, manufactured by HIBA FINE CHEMICAL CO., LTD., specific surface area: 94 m$^2$/g, volume-based median particle size: 0.05 μm)

9: PV32 (Graphtol Bordeaux HF3R, manufactured by Clariant Japan, specific surface area: 56 m$^2$/g, volume-based median particle size: 0.12 μm)

10: PR185 (Graphtol Cermine HF4C, manufactured by Clariant Japan, specific surface area: 45 m$^2$/g, volume-based median particle size: 0.18 μm)

11: PR208 (Graphtol Red HF2B, manufactured by Clariant Japan, specific surface area: 65 m$^2$/g, volume-based median particle size: 0.05 μm)

(b) Mixture of a cyclic compound having C=O in the molecule and a cyclic compound having a functional group selected from NH, S and O in the molecule 12: Vat Blue 1 (reagent, manufactured by KANTO CHEMICAL CO., INC.)

(c) Phthalocyanine compound which may be substituted and contain a metal

13: PB15:3 (IRGALITE Blue GBP, manufactured by CHIBA FINE CHEMICAL CO., LTD.)

14: PB15 (IRGALITE Blue BLPO, manufactured by CHIBA FINE CHEMICAL CO., LTD.)

15: PB15:6 (FASTROGEN Blue EP-7, manufactured by DAINIPPON INK AND CHEMICALS, INCORPORATED.)

<Organic Crystal Nucleus Agent Other Than Organic Pigment>
16: Ethylenebis-12-hydroxystearic acid amide (SLIPAX H, manufactured by Nippon Kasei Chemical Co., Ltd.)
<Plasticizer>
17: Diester of succinic acid and triethylene glycol monomethyl ether obtained in Synthesis Example 4-1 of Plasticizer described below
<Hydrolysis Inhibitor>
18: Diisopropylphenyl carbodiimide (Stabaxol 1-LF, manufactured by Rhein Chemie Japan)
19: Poly(4,4'-dicyclohexylmethane carbodiimide) (CARBODILITE LA-1, manufactured by Nisshinbo Chemical, Inc.)
<Inorganic Filler>
20: Talc (MicroAce P-6, manufactured by Nippon Talc Co., Ltd.)
21: Glass fiber (ECS03T-187, manufactured by Nippon Electric Glass Co., Ltd.)
<Flame Retardant>
22: Aluminum hydroxide (BT703ST, Nippon Light Metal Co., Ltd.)

Synthesis Example 4-1 of Plasticizer

In a 3-L flask equipped with a stirrer, a thermometer and a dehydration tube, 500 g of succinic anhydride, 2,463 g of triethylene glycol monomethyl ether and 9.5 g of paratoluenesulfonic acid monohydrate were charged and the mixture was reacted under reduced pressure of 4 to 10.7 kPa at 110° C. for 15 hours, while blowing nitrogen (500 mL/minute) into the space. The acid value of the reaction solution was 1.6 (KOH mg/g). To the reaction solution, 27 g of an adsorbent Kyoward 500SH (manufactured by Kyowa Chemical Industry Co., Ltd.) was added, stirred at 80° C. at 2.7 kPa for 45 minutes, and filtered. Thereafter, triethylene glycol monomethyl ether was distilled off at a liquid temperature of 115 to 200° C. at a pressure of 0.03 kPa. After cooling to 80° C., the residual liquid was filtered under reduced pressure, to give a diester of succinic acid and triethylene glycol monomethyl ether as a filtrate. The resultant diester had an acid value of 0.2 (KOH mg/g), a saponification value of 276 (KOH mg/g), a hydroxyl value of 1 or less (KOH mg/g) and a hue of APHA200.

Examples 4-1 to 4-16 and Comparative Example 4-1

The pellets of the polylactic acid resin compositions (the products 4-A to 4-P of the present invention and the comparative product 4-a) obtained in Synthesis Example 4-1 were supplied into an injection molding machine (Mucell 85 ton, manufactured by The Japan Steel Works, Ltd.) set at a cylinder temperature of 200° C. for melting, while a supercritical fluid (carbon dioxide in a supercritical state) pressurized to 8 MPa was introduced through the gas inlet port provided at the cylinder section of the injection molding machine in the concentration shown in Table 33. The supercritical fluid was brought into contact with the polylactic acid resin composition in a melted state by kneading with the screw. The temperature inside the die attached to the tip of the injection molding machine was maintained at the temperature shown in Table 33, and the melted polylactic acid resin composition in contact with the carbon dioxide in a supercritical state was molded with injection-molding in this die at an injection pressure required for the molding as shown in Table 33, and retained therein until the crystallization was completed, to obtain a test piece (150 mm×30 mm×1 mm in thickness). The die retention time required for the release of the resultant test piece was evaluated by the following criteria. The results are shown in Table 33.
<Evaluation Criteria for Die Retention Time Required for Release>
The time taken to be decided that each test piece was not deformed and was easily taken out under the molding conditions shown in Table 33 was defined as the die retention time required for the release. Here, the higher the rates of melt crystallization of the test piece inside the die and at the runner part, the shorter the die retention time required for the release.

Comparative Examples 4-2 to 4-4

In the same manner as in Example 4-1, except that the pellets of the polylactic acid resin compositions (the products 4-A, 4-E, and 4-I of the present invention) obtained in Synthesis Example 4-1 were used, carbon dioxide in a supercritical state was not introduced under the pressure, and the injection molding was performed at the die temperature shown in Table 33 at an injection pressure required for the molding as shown in Table 33, a test piece was obtained and the die retention time required for the release was evaluated in the same manner. The results are shown in Table 33.

TABLE 33

| | Resin Composition | Die Temp. (° C.) | Supercritical $CO_2$ Concentration*1 (% by wt.) | Injection Pressure (MPa) | Die Retention Time Required for Release*2 (s) |
|---|---|---|---|---|---|
| Examples | | | | | |
| 4-1 | 4-A | 80 | 2 | 54 | 30 |
| | | 70 | | 57 | 35 |
| 4-2 | 4-B | 80 | 2 | 54 | 32 |
| | | 70 | | 57 | 37 |
| 4-3 | 4-C | 80 | 2 | 54 | 45 |
| | | 70 | | 57 | 50 |
| 4-4 | 4-D | 80 | 2 | 54 | 35 |
| | | 70 | | 57 | 40 |
| 4-5 | 4-E | 80 | 2 | 54 | 30 |
| | | 70 | | 57 | 35 |
| 4-6 | 4-F | 80 | 2 | 54 | 37 |
| | | 70 | | 57 | 42 |
| 4-7 | 4-G | 80 | 2 | 54 | 45 |
| | | 70 | | 57 | 50 |
| 4-8 | 4-H | 80 | 2 | 54 | 50 |
| | | 70 | | 57 | 60 |
| 4-9 | 4-I | 80 | 2 | 54 | 30 |
| | | 70 | | 57 | 35 |

TABLE 33-continued

|  | Resin Composition | Die Temp. (° C.) | Supercritical $CO_2$ Concentration[*1] (% by wt.) | Injection Pressure (MPa) | Die Retention Time Required for Release[*2] (s) |
|---|---|---|---|---|---|
| 4-10 | 4-J | 80 | 2 | 54 | 50 |
|  |  | 70 |  | 57 | 60 |
| 4-11 | 4-K | 80 | 2 | 54 | 47 |
|  |  | 70 |  | 57 | 58 |
| 4-12 | 4-L | 80 | 2 | 54 | 50 |
|  |  | 70 |  | 57 | 60 |
| 4-13 | 4-M | 80 | 2 | 54 | 25 |
|  |  | 70 |  | 57 | 30 |
| 4-14 | 4-N | 80 | 2 | 39 | 13 |
|  |  | 70 |  | 38 | 15 |
| 4-15 | 4-O | 70 | 5 | 30 | 15 |
| 4-16 | 4-P | 80 | 1 | 63 | 25 |
| Comparative Examples |  |  |  |  |  |
| 4-1 | 4-a | 80 | 2 | 58 | 180 |
|  |  | 70 |  | 60 | 300 |
| 4-2 | 4-A | 80 | 0 | 78 | 70 |
|  |  | 70 |  | 92 | 130 |
| 4-3 | 4-E | 80 | 0 | 79 | 60 |
|  |  | 70 |  | 91 | 120 |
| 4-4 | 4-I | 80 | 0 | 80 | 65 |
|  |  | 70 |  | 93 | 130 |

[*1]The concentration based on the polylactic acid resin composition.
[*2]Total of Time for Keeping Injection Pressure and Cooling Time (s).

It was found from the results shown in Table 33 that, as compared with Comparative Example 4-1 in which the organic crystal nucleus agent of the present invention was not contained or Comparative Examples 4-2 to 4-4 in which the supercritical fluid was not brought into contact with the polylactic acid resin composition during the melt-kneading, the manufacturing method of the present invention enabled a remarkable reduction of the die retention time by the synergistic effect of the organic crystal nucleus agent of the present invention and the supercritical fluid, resulting in an improvement in moldability by leaps and bounds. The lower the die temperature was, the more remarkable the effect was. It was also found that the injection pressure upon molding was decreased by bringing the supercritical fluid into contact with the polylactic acid resin composition during the melt-kneading.

Examples 4-17 to 4-19 and Comparative Example 4-5

In the same manner as in Example 4-1, except that the pellets of the polylactic acid resin compositions (the products 4-E, 4-N, and 4-O of the present invention and the comparative product 4-a) obtained in Synthesis Example 4-1 were used, and the die temperatures, the supercritical carbon dioxide concentrations and the die retention times shown in Table 34 were employed, the injection molding was performed. With respect to the resultant test pieces [a flat plate (70 mm×40 mm×3 mm) and a prism-shaped specimen (125 mm×12 mm×6 mm)], the bending test and thermal deformation temperature were evaluated by the following methods for the prism-shaped specimen (125 mm×12 mm×6 mm), while the relative crystallinity, bleeding resistance and expansion ratio were evaluated by the following methods for the flat plate (70 mm×40 mm×3 mm). The results are shown in Table 34.

<Criteria for Evaluation of Die Releasability>
A: The test piece is not deformed and is easily taken out.
B: The test piece is slightly deformed and difficult to be taken out.
C: The test piece is largely deformed and is not released from the runner part.

Here, with respect to the mold releasability, the higher the rates of melt crystallization of the test piece inside the die and at the runner part, the more satisfactory the moldability.

<Bending Test (Rigidity)>
For the prism-shaped specimen (125 mm×12 mm×6 mm), a bending test was performed according to JIS K7203 using Tensilon (Tensilon universal testing machine RTC-1210A, manufactured by Orientec Co., Ltd.) to determine a flexural modulus. The crosshead speed was 3 mm/min. The higher flexural moduli show more excellent rigidities.

<Thermal Deformation Temperature (Heat Resistance)>
For the prism-shaped specimen (125 mm×12 mm×6 mm), the temperature was measured at which the specimen was deflected by 0.025 mm under a load of 0.45 MPa, according to JIS-K7207 using a thermal deformation temperature measuring device (B-32, manufactured by Toyo Seiki Seisaku-sho, Ltd.). The higher temperatures show more excellent heat resistances.

<Relative Crystallinity>
The test piece of the flat plate (70 mm×40 mm×3 mm) after the injection molding was crushed. After accurately weighing 7.0 to 8.0 mg of the crushed test piece, the crushed test piece was enclosed in an aluminum pan. Thereafter, using a DSC apparatus (Diamond DSC, manufactured by PerkinElmer), as the 1st RUN, the temperature was raised from 20° C. to 200° C. at a temperature rise rate of 20° C./minute, maintained at 200° C. for 5 minutes, then dropped from 200° C. to 20° C. at a temperature drop rate of −20° C./minute and maintained at 20° C. for one minute. Subsequently, as the 2nd RUN, the temperature was raised from 20° C. to 200° C. at a temperature rise rate of 20° C./minute. The absolute value ΔHcc of the cold crystallization enthalpy of polylactic acid resin observed in the 1st RUN, and the crystal melt enthalpy ΔHm observed in the 2nd RUN were determined, and the values obtained was used to determine the relative crystallinity (%) by the following equation.

$$\text{Relative Crystallinity (\%)} = \{(\Delta Hm - \Delta Hcc)/\Delta Hm\} \times 100$$

<Bleeding Resistance>
The flat plate (70 mm×40 mm×3 mm) after the injection molding was allowed to stand in an oven at 80° C. for one month, and visually observed for the absence or presence of bleeding of the organic crystal nucleus agent and/or the plasticizer on the surface.

<Expansion Ratio>
The expansion ratio was determined by the following equation.

> Expansion Ratio=(Density of Molded Article Subjected to Injection Molding Without Using Supercritical Fluid)/(Density of Molded Article Subjected to Injection Molding Using Supercritical Fluid)     (5)

Here, the density of the molded article was determined according to JIS K-7112 (Method B: Pycnometer Method).

TABLE 34

| | Molding Conditions and Releasability | | | | | Physical Properties of Molded Article | | | | |
| --- | --- | --- | --- | --- | --- | --- | --- | --- | --- | --- |
| | Resin Composition | Die Temp. (°C.) | Supercritical $CO_2$ Concentration*[1] (% by wt.) | Die Retention Time (s) | Die Releasability | Flexural Modulus (GPa) | Thermal Deformation Temp. (°C.) at 0.45 MPa | Relative Crystallinity (%) | Bleeding Resistance at 80°C. for one month | Expansion Ratio |
| Examples | | | | | | | | | | |
| 4-17 | 4-E | 80 | 2 | 30 | A | 4.6 | 84 | 100 | No Bleeding | 1.01 |
| 4-18 | 4-N | 80 | 2 | 13 | A | 1.3 | 72 | 100 | No Bleeding | 1.02 |
| 4-19 | 4-O | 70 | 5 | 15 | A | 2.4 | 114 | 100 | No Bleeding | 1.00 |
| Comparative Example | | | | | | | | | | |
| 4-5 | 4-a | 300 | 2 | 30 | B | 3.1 | 52 | 0 | No Bleeding | 1.00 |

*[1] The concentration based on the polylactic acid resin composition.

It was found from the results shown in Table 34 that the manufacturing method of the present invention enabled achievement of high crystallinity by the synergistic effect of the organic crystal nucleus agent of the present invention and the supercritical fluid, and thus a polylactic acid resin injection molded article having excellent heat resistance was obtained.

In addition, the manufacturing method of the present invention enables achievement of satisfactory moldability without adding plasticizer. While, adding a plasticizer makes the rigidity lower, but the manufacturing method of the present invention enables achievement of satisfactory moldability without adding plasticizer, so that a polylactic acid resin molded article having high rigidity (flexural modulus) can be obtained (as can be seen that a polylactic acid resin molded article having a high rigidity is obtained in Example 4-17 in comparison with Examples 4-18 and 4-19).

Therefore, it is found that the manufacturing method of the present invention is an advantageous technique as compared with the technique of achieving satisfactory moldability by the addition of plasticizer in the field which requires a polylactic acid resin molded article having high rigidity.

Synthesis Example 4-2 of Polylactic Acid Resin Composition

As polylactic acid resin compositions, the raw materials of the products (4-A-2 to 4-P-2) of the present invention and the comparative product (4-a-2) shown in Table 35 were melt-kneaded at 230° C. in a twin screw extruder (PCM-45, manufactured by IKEGAI, Ltd.) and strand cut, to give pellets of the polylactic acid resin compositions. The resultant pellets were dried in a dehumidification dryer at 80° C. for 5 hours to a water content of 500 ppm or less.

TABLE 35

| Polylactic Acid Resin Composition (Parts by Weight) | Products of the Present Invention (4-A-2 to 4-P-2) | | | | | | | | | | | | | | | | Comparative Product 4-a-2 |
| --- | --- | --- | --- | --- | --- | --- | --- | --- | --- | --- | --- | --- | --- | --- | --- | --- | --- |
| | A-2 | B-2 | C-2 | D-2 | E-2 | F-2 | G-2 | H-2 | I-2 | J-2 | K-2 | L-2 | M-2 | N-2 | O-2 | P-2 | |
| Polylactic Acid Resin | | | | | | | | | | | | | | | | | |
| Poly-L-Lactic Acid Resin*[23] | 100 | 100 | 100 | 100 | 100 | 100 | 100 | 100 | 100 | 100 | 100 | 100 | 100 | 100 | — | — | 100 |
| Poly-D-Lactic Acid Resin*[24] | — | — | — | — | — | — | — | — | — | — | — | — | — | — | — | 100 | — |
| Organic Crystal Nucleus Agent | | | | | | | | | | | | | | | | | |
| PY109*[4] | 0.5 | — | — | — | — | — | — | — | — | — | — | — | — | — | — | — | — |
| PY110*[5] | — | 0.5 | — | — | — | — | — | — | — | — | — | — | — | — | — | — | — |
| PR272*[6] | — | — | 0.5 | — | — | — | — | — | — | — | — | — | — | — | — | — | — |
| PR254(1)*[7] | — | — | — | 0.5 | — | — | — | — | — | — | — | — | — | — | — | — | — |
| PR254(2)*[8] | — | — | — | — | 0.5 | — | — | — | — | — | — | — | 0.5 | 0.5 | — | — | — |
| PV32*[9] | — | — | — | — | — | 0.5 | — | — | — | — | — | — | — | — | — | — | — |
| PR185*[10] | — | — | — | — | — | — | 0.5 | — | — | — | — | — | — | — | — | — | — |
| PR208*[11] | — | — | — | — | — | — | — | 0.5 | — | — | — | — | — | — | — | — | — |

TABLE 35-continued

| Polylactic Acid Resin Composition (Parts by Weight) | Products of the Present Invention (4-A-2 to 4-P-2) | | | | | | | | | | | | | | | | Comparative Product 4-a-2 |
|---|---|---|---|---|---|---|---|---|---|---|---|---|---|---|---|---|---|
| | A-2 | B-2 | C-2 | D-2 | E-2 | F-2 | G-2 | H-2 | I-2 | J-2 | K-2 | L-2 | M-2 | N-2 | O-2 | P-2 | 4-a-2 |
| PB15:3*[13] | — | — | — | — | — | — | — | — | 0.5 | — | — | — | — | — | 0.5 | 0.5- | — |
| PB15*[14] | — | — | — | — | — | — | — | — | — | 0.5 | — | — | — | — | — | — | — |
| PB15:6*[15] | — | — | — | — | — | — | — | — | — | — | 0.5 | — | — | — | — | — | — |
| Vat Blue 1*[12] | — | — | — | — | — | — | — | — | — | — | — | 0.5 | — | — | — | — | — |
| OHC18EB*[16] | — | — | — | — | — | — | — | — | — | — | — | — | 0.5 | 0.5 | — | — | — |
| Plasticizer | | | | | | | | | | | | | | | | | |
| (MeEO$_3$)2SA*[17] Hydrolysis Inhibitor | — | — | | | | | | | | | | | 10 | 12.5 | 5 | | — |
| MCI*[18] | 1 | 1 | 1 | 1 | 1 | 1 | 1 | 1 | 1 | 1 | 1 | 1 | 1 | 1 | — | 1 | 1 |
| PCI*[19] | | | | | | | | | | | | | | | 1 | | |
| Inorganic Filler | | | | | | | | | | | | | | | | | |
| Talc*[20] | — | — | — | — | — | — | — | — | — | — | — | — | — | — | 20 | — | — |
| Glass Fiber*[21] | — | — | — | — | — | — | — | — | — | — | — | — | — | — | — | 12 | — |
| Flame Retardant | | | | | | | | | | | | | | | | | |
| Al(OH)$_3$*[22] | — | — | — | — | — | — | — | — | — | — | — | — | — | — | — | 120 | — |

Here, the raw materials in Table 35 represent the same as the raw materials in Table 32, and the other raw materials are described below.

<Polylactic Acid Resin>

23: Polylactic acid resin (poly-L-lactic acid resin) obtained in Synthesis Example 4-1 of Polylactic Acid Resin described below 24: Polylactic acid resin (poly-D-lactic acid resin) obtained in Synthesis Example 4-2 of Polylactic Acid Resin described below

Synthesis Example 4-1 of Polylactic Acid Resin (Production of Poly-L-lactic Acid Resin)

To 100 parts by weight of L-lactide (manufactured by Musashino Chemical Laboratory, Ltd., optical purity: 100%), 0.005 parts by weight of tin octylate was added. The mixture was reacted under a nitrogen atmosphere in a reactor having an agitating blade at 180° C. for 2 hours, subsequently placed under reduced pressure to remove the remaining lactide, and made into chips to obtain poly-L-lactic acid. The resultant poly-L-lactic acid had a weight-average molecular weight of 110,000, a glass transition temperature (Tg) of 60° C. and a melting point of 166° C.

Synthesis Example 4-2 of Polylactic Acid Resin (Production of Poly-D-lactic Acid Resin)

To 100 parts by weight of D-lactide (manufactured by Musashino Chemical Laboratory, Ltd., optical purity: 100%), 0.005 parts by weight of tin octylate was added. The mixture was reacted under a nitrogen atmosphere in a reactor having an agitating blade at 180° C. for 2 hours, subsequently placed under reduced pressure to remove the remaining lactide, and made into chips to obtain poly-D-lactic acid. The resultant poly-D-lactic acid had a weight-average molecular weight of 110,000, a glass transition temperature (Tg) of 60° C. and a melting point of 167° C.

Examples 4-20 to 4-35 and Comparative Example 4-6

The pellets of the polylactic acid resin compositions (the products 4-A-2 to 4-P-2 of the present invention and the comparative product 4-a-2) obtained in Synthesis Example 4-2 were supplied into an injection molding machine (Mucell 85 ton, manufactured by The Japan Steel Works, Ltd.) set at a cylinder temperature of 230° C. for melting, while a supercritical fluid (carbon dioxide in a supercritical state) pressurized to 8 MPa was introduced through the gas inlet port provided at the cylinder section of the injection molding machine in the concentration shown in Table 36. The supercritical fluid was brought into contact with the polylactic acid resin composition in a melted state by kneading with the screw. The temperature inside the die attached to the tip of the injection molding machine was maintained at the temperature shown in Table 36, and the melted polylactic acid resin composition in contact with the carbon dioxide in a supercritical state was molded with injection-molding in this die at an injection pressure required for the molding as shown in Table 36, and retained therein until the crystallization was completed, to obtain a test piece (150 mm×30 mm×1 mm in thickness). The die retention time required for the release of the resultant test piece was evaluated in the same manner as in Example 4-1. The results are shown in Table 36.

Comparative Examples 4-7 to 4-9

In the same manner as in Example 4-20, except that the pellets of the polylactic acid resin compositions (the products 4-A-2, 4-E-2, and 4-I-2 of the present invention) obtained in Synthesis Example 4-2 were used, carbon dioxide in a supercritical state was not introduced under the pressure, and the injection molding was performed at the die temperature shown in Table 36 at an injection pressure required for the molding as shown in Table 36, a test piece was obtained and the die retention time required for the release was evaluated in the same manner. The results are shown in Table 36.

TABLE 36

| | Resin Composition | Die Temp. (° C.) | Supercritical CO$_2$ Concentration*[1] (% by wt.) | Injection Pressure (MPa) | Die Retention Time Required for Release*[2] (s) |
|---|---|---|---|---|---|
| Examples | | | | | |
| 4-20 | 4-A-2 | 80 | 2 | 58 | 25 |
| | | 70 | | 60 | 30 |
| 4-21 | 4-B-2 | 80 | 2 | 59 | 26 |
| | | 70 | | 60 | 32 |
| 4-22 | 4-C-2 | 80 | 2 | 59 | 37 |
| | | 70 | | 61 | 42 |
| 4-23 | 4-D-2 | 80 | 2 | 59 | 30 |
| | | 70 | | 60 | 32 |
| 4-24 | 4-E-2 | 80 | 2 | 60 | 25 |
| | | 70 | | 58 | 30 |
| 4-25 | 4-F-2 | 80 | 2 | 60 | 26 |
| | | 70 | | 58 | 35 |
| 4-26 | 4-G-2 | 80 | 2 | 58 | 37 |
| | | 70 | | 57 | 40 |
| 4-27 | 4-H-2 | 80 | 2 | 60 | 42 |
| | | 70 | | 62 | 52 |
| 4-28 | 4-I-2 | 80 | 2 | 60 | 35 |
| | | 70 | | 59 | 30 |
| 4-29 | 4-J-2 | 80 | 2 | 60 | 42 |
| | | 70 | | 62 | 52 |
| 4-30 | 4-K-2 | 80 | 2 | 58 | 40 |
| | | 70 | | 60 | 50 |
| 4-31 | 4-L-2 | 80 | 2 | 59 | 43 |
| | | 70 | | 61 | 53 |
| 4-32 | 4-M-2 | 80 | 2 | 58 | 20 |
| | | 70 | | 59 | 25 |
| 4-33 | 4-N-2 | 80 | 2 | 41 | 9 |
| | | 70 | | 42 | 10 |
| 4-34 | 4-O-2 | 70 | 5 | 33 | 10 |
| 4-35 | 4-P-2 | 80 | 1 | 67 | 20 |
| Comparative Examples | | | | | |
| 4-6 | 4-a-2 | 80 | 2 | 61 | 150 |
| | | 70 | | 62 | 270 |
| 4-7 | 4-A-2 | 80 | 0 | 86 | 65 |
| | | 70 | | 98 | 120 |
| 4-8 | 4-E-2 | 80 | 0 | 88 | 55 |
| | | 70 | | 97 | 110 |
| 4-9 | 4-I-2 | 80 | 0 | 88 | 60 |
| | | 70 | | 99 | 120 |

*[1]The concentration based on the polylactic acid resin composition.
*[2]Total of Time for Keeping Injection Pressure and Cooling Time (s).

It was found from the results shown in Table 36 that, also in a stereocomplex polylactic acid resin, as compared with Comparative Example 4-6 in which the organic crystal nucleus agent of the present invention was not contained or Comparative Examples 4-7 to 4-9 in which the supercritical fluid was not brought into contact with the polylactic acid resin composition during the melt-kneading, the manufacturing method of the present invention enabled a remarkable reduction of the die retention time by the synergistic effect of the organic crystal nucleus agent of the present invention and the supercritical fluid, resulting in an improvement in moldability by leaps and bounds. The lower the die temperature was, the more remarkable the effect was. It was also found that the injection pressure upon molding was decreased by bringing the supercritical fluid into contact with the polylactic acid resin composition during the melt-kneading.

Examples 4-36 to 4-38 and Comparative Example 4-10

In the same manner as in Example 4-20, except that the pellets of the polylactic acid resin compositions (the products 4-E-2, 4-N-2, and 4-O-2 of the present invention and the comparative product 4-a-2) obtained in Synthesis Example 4-2 were used, and the die temperatures, the supercritical carbon dioxide concentrations and the die retention times shown in Table 37 were employed, the injection molding was performed. With respect to the resultant test pieces [a flat plate (70 mm×40 mm×3 mm) and a prism-shaped specimen (125 mm×12 mm×6 mm)], the bending test and thermal deformation temperature were evaluated in the same manner as in Example 4-17 for the prism-shaped specimen (125 mm×12 mm×6 mm), while the relative crystallinity, bleeding resistance and expansion ratio were evaluated in the same manner as in Example 4-17 for the flat plate (70 mm×40 mm×3 mm). The results are shown in Table 37.

TABLE 37

| | Molding Conditions and Releasability | | | | | Physical Properties of Molded Article | | | | |
|---|---|---|---|---|---|---|---|---|---|---|
| | Resin Composition | Die Temp. (° C.) | Supercritical CO$_2$ Concentration*1 (% by wt.) | Die Retension Time (s) | Die Releasability | Flexural Modulus (GPa) | Thermal Deformation Temp. (° C.) at 0.45 MPa | Relative Crystallinity (%) | Bleeding Resistance at 80° C. for one month | Expansion Ratio |
| Examples | | | | | | | | | | |
| 4-36 | 4-E-2 | 80 | 2 | 30 | A | 4.7 | 85 | 100 | No Bleeding | 1.00 |
| 4-37 | 4-N-2 | 80 | 2 | 13 | A | 1.4 | 73 | 100 | No Bleeding | 1.01 |
| 4-38 | 4-O-2 | 70 | 5 | 15 | A | 2.4 | 116 | 100 | No Bleeding | 1.01 |
| Comparative Example | | | | | | | | | | |
| 4-10 | 4-a-2 | 300 | 2 | 30 | B | 3.2 | 52 | 0 | No Bleeding | 1.00 |

*1 The concentration based on the polylactic acid resin composition.

It was found from the results shown in Table 37 that the manufacturing method of the present invention enabled achievement of high crystallinity by the synergistic effect of the organic crystal nucleus agent of the present invention and the supercritical fluid, and thus a polylactic acid resin injection molded article having excellent heat resistance was obtained.

In addition, also in a stereocomplex polylactic acid resin, the manufacturing method of the present invention enables achievement of satisfactory moldability without adding plasticizer. While, adding a plasticizer makes the rigidity lower, but the manufacturing method of the present invention enables achievement of satisfactory moldability without adding plasticizer, so that a stereocomplex polylactic acid resin molded article having high rigidity (flexural modulus) can be obtained (as can be seen that a polylactic acid resin molded article having a high rigidity is obtained in Example 4-36 in comparison with Examples 4-37 and 4-38).

Therefore, it is found that the manufacturing method of the present invention is an advantageous technique as compared with the technique of achieving satisfactory moldability by the addition of plasticizer in the field which requires a stereocomplex polylactic acid resin molded article having high rigidity.

Synthesis Example 4-3 of Polylactic Acid Resin Composition

As polylactic acid resin compositions, the raw materials of the products (4-Q to 4-T) of the present invention and the comparative product (4-b) shown in Table 38 were melt-kneaded at 240° C. in a twin screw extruder (PCM-45, manufactured by IKEGAI, Ltd.) and strand cut, to give pellets of the polylactic acid resin compositions. The resultant pellets were dried in a dehumidification dryer at 80° C. for 5 hours to a water content of 500 ppm or less.

TABLE 38

| Composition of Raw Materials | Products of the Present Invention | | | | Comparative Product |
|---|---|---|---|---|---|
| Formulated (Parts by Weight) | 4-Q | 4-R | 4-S | 4-T | 4-b |
| Resin | | | | | |
| Poly-L-Lactic Acid Resin*25 | 50 | 70 | 80 | 70 | 70 |
| Polycarbonate Resin*26 | 50 | 30 | 20 | 30 | 30 |
| Organic Crystal Nucleus Agent | | | | | |
| PR254(2)*8 | 0.5 | 0.7 | 0.8 | 0.7 | — |
| Plasticizer | | | | | |

TABLE 38-continued

| Composition of Raw Materials | Products of the Present Invention | | | | Comparative Product |
|---|---|---|---|---|---|
| Formulated (Parts by Weight) | 4-Q | 4-R | 4-S | 4-T | 4-b |
| (MeEO$_3$)2SA*17 Hydrolysis Inhibitor | — | — | — | 7 | — |
| MCI*18 | 1 | 1 | 1 | 1 | 1 |
| PCI*19 | — | — | — | — | — |
| Inorganic Filler | | | | | |
| Talc*20 | — | — | — | — | — |
| Glass Fiber*21 | — | — | — | — | — |
| Flame Retardant | | | | | |
| Al(OH)$_3$*22 | — | — | — | — | — |

Here, the raw materials in Table 38 represent the same as the raw materials in Table 32, and the other raw materials are described below.

<Resin>

25: Polylactic acid resin (Nature Works 4032D, manufactured by Nature Works)

(Optical purity: 98.5%, weight-average molecular weight: 141,000, residual monomer: 1,200 ppm)

26: Polycarbonate resin (Panlite L-1250Y, manufactured by TEIJIN CHEMICALS LTD.)

(Crystallinity: 0%, glass transition temperature: 120° C.)

Examples 4-39 to 4-42 and Comparative Example 4-11

The pellets of the polylactic acid resin compositions (the products 4-Q to 4-T of the present invention and the comparative product 4-b) obtained in Synthesis Example 4-3 were supplied into an injection molding machine (Mucell 85 ton, manufactured by The Japan Steel Works, Ltd.) set at a cylinder temperature of 220° C. for melting, while a supercritical fluid (carbon dioxide in a supercritical state) pressurized to 8 MPa was introduced through the gas inlet port provided at the cylinder section of the injection molding machine in the concentration shown in Table 39. The supercritical fluid was brought into contact with the polylactic acid resin composition in a melted state by kneading with the screw. The temperature inside the die attached to the tip of the injection molding machine was maintained at the temperature shown in Table 39, and the melted polylactic acid resin composition in contact with the carbon dioxide in a supercritical state was molded with injection-molding in this die at an injection pressure required for the molding as shown in Table 39, and retained therein until the crystallization was completed, to obtain a test piece (150 mm×30 mm×1 mm in thickness). The die retention time required for the release of the resultant test piece was evaluated in the same manner as in Example 4-1. The results are shown in Table 39.

Comparative Examples 4-12 to 4-15

In the same manner as in Example 4-39, except that the pellets of the polylactic acid resin compositions (the products 4-Q to 4-T of the present invention) obtained in Synthesis Example 4-3 were used, carbon dioxide in a supercritical state was not introduced under the pressure, and the injection molding was performed at the die temperature shown in Table 39 at an injection pressure required for the molding as shown in Table 39, a test piece was obtained and the die retention time required for the release was evaluated in the same manner. The results are shown in Table 39.

time by the synergistic effect of the organic crystal nucleus agent of the present invention and the supercritical fluid, resulting in an improvement in moldability by leaps and bounds. The lower the die temperature was, the more remarkable the effect was. It was also found that the injection pressure upon molding was decreased by bringing the supercritical fluid into contact with the polylactic acid resin composition during the melt-kneading.

Examples 4-43 to 4-46 and Comparative Example 4-16

In the same manner as in Example 4-39, except that the pellets of the polylactic acid resin compositions (the products 4-Q to 4-T of the present invention and the comparative product 4-b) obtained in Synthesis Example 4-3 were used, and the die temperatures, the supercritical carbon dioxide concentrations and the die retention times shown in Table 40 were employed, the injection molding was performed. With

TABLE 39

| | Resin Composition | Die Temp. (° C.) | Supercritical $CO_2$ Concentration*[1] (%) | Injection Pressure (MPa) | Die Retention Time Required for Release*[2] (s) |
|---|---|---|---|---|---|
| Examples | | | | | |
| 4-39 | 4-Q | 80 | 2 | 99 | 30 |
| 4-40 | 4-R | 80 | 2 | 79 | 32 |
| 4-41 | 4-S | 80 | 2 | 72 | 35 |
| 4-42 | 4-T | 80 | 2 | 62 | 15 |
| Comparative Examples | | | | | |
| 4-11 | 4-b | 80 | 2 | 70 | 150 |
| 4-12 | 4-Q | 80 | 0 | 120 | 70 |
| 4-13 | 4-R | 80 | 0 | 110 | 75 |
| 4-14 | 4-S | 80 | 0 | 98 | 75 |
| 4-15 | 4-T | 80 | 0 | 80 | 55 |

*[1]The concentration based on the polylactic acid resin composition.

*[2]Total of Time for Keeping Injection Pressure and Cooling Time (s).

It was found from the results shown in Table 39 that, also in a mixture system of the polylactic acid resin and another thermoplastic resin, as compared with Comparative Example 4-11 in which the organic crystal nucleus agent of the present invention was not contained or Comparative Examples 4-12 to 4-15 in which the supercritical fluid was not brought into contact with the polylactic acid resin composition during the melt-kneading, the manufacturing method of the present invention enabled a remarkable reduction of the die retention respect to the resultant test pieces [a flat plate (70 mm×40 mm×3 mm) and a prism-shaped specimen (125 mm×12 mm×6 mm)], the bending test and thermal deformation temperature were evaluated in the same manner as in Example 4-17 for the prism-shaped specimen (125 mm×12 mm×6 mm), while the relative crystallinity, bleeding resistance and expansion ratio were evaluated in the same manner as in Example 4-17 for the flat plate (70 mm×40 mm×3 mm). The results are shown in Table 40.

TABLE 40

| | Resin Composition | Die Temp. (° C.) | Supercritical CO$_2$ Concentration*[1] (%) | Die Retension Time (s) | Die Releasability | Flexural Modulus (GPa) | Thermal Deformation Temp. (° C.) at 0.45 MPa | Relative Crystallinity (%) | Bleeding Resistance at 80° C. for one month | Expansion Ratio |
|---|---|---|---|---|---|---|---|---|---|---|
| Examples | | | | | | | | | | |
| 4-43 | 4-Q | 80 | 2 | 30 | A | 3.6 | 111 | 100 | No Bleeding | 1.00 |
| 4-44 | 4-R | 80 | 2 | 32 | A | 3.9 | 123 | 100 | No Bleeding | 1.02 |
| 4-45 | 4-S | 80 | 2 | 35 | A | 4.1 | 125 | 100 | No Bleeding | 1.00 |
| 4-46 | 4-T | 80 | 2 | 15 | A | 2.0 | 91 | 100 | No Bleeding | 1.01 |
| Comparative Example | | | | | | | | | | |
| 4-16 | 4-b | 30 | 0 | 60 | B | 2.7 | 65 | 7 | No Bleeding | 1.00 |

*[1]The concentration based on the polylactic acid resin composition.

It was found from the results shown in Table 40 that the manufacturing method of the present invention enabled achievement of high crystallinity by the synergistic effect of the organic crystal nucleus agent of the present invention and the supercritical fluid, and thus a polylactic acid resin injection molded article having excellent heat resistance was obtained.

In addition, also in a mixture system of the polylactic acid resin and another thermoplastic resin, the manufacturing method of the present invention enables achievement of satisfactory moldability without adding plasticizer, and high heat resistance is achieved by blending the polylactic acid having high crystallinity with another thermoplastic resin having high Tg. While, adding a plasticizer makes the rigidity lower, but the manufacturing method of the present invention enables achievement of satisfactory moldability while allowing for crystallization of polylactic acid without adding plasticizer, so that a polylactic acid resin molded article having high rigidity (flexural modulus) can be obtained (as can be seen that a polylactic acid resin molded article having a high rigidity is obtained in Examples 4-43 to 4-45 in comparison with Example 4-46).

Therefore, it is found that the manufacturing method of the present invention is an advantageous technique as compared with the technique of achieving satisfactory moldability while allowing for crystallization of polylactic acid by the addition of plasticizer in the field which requires a polylactic acid resin molded article containing another thermoplastic resin having high rigidity and high Tg to have higher heat resistance and higher rigidity.

The invention claimed is:

1. A method of manufacturing a polylactic acid resin injection molded article, wherein the expansion ratio of the polylactic acid resin injection molded article is 1.05 times or less, said method having the following step (1) and step (2):
   step (1): a step of melt-kneading a polylactic acid resin composition while contacting the composition with a supercritical fluid, wherein the composition comprises a polylactic acid resin and at least one organic crystal nucleus agent selected from the group consisting of an aliphatic amide compound having at least one hydroxyl group in the molecule, an aliphatic ester compound having at least one hydroxyl group in the molecule, a metal salt of phenylphosphonic acid, a carbohydrazide, a melamine compound, an uracil, an N-substituted urea, and an organic pigment, wherein the organic pigment comprises (a) a cyclic compound having C=O and a functional group selected from NH and O in the molecule, (b) a mixture of a cyclic compound having C=O in the molecule and a cyclic compound having a functional group selected from NH, S and O in the molecule, (c) a phthalocyanine compound which may be substituted and contain a metal, and/or (d) a porphyrin compound which may be substituted; and
   step (2): a step of filling the melted product obtained in step (1) in a die to mold with injection-molding.

2. The method of manufacturing a polylactic acid resin injection molded article according to claim 1, wherein the polylactic acid resin composition comprises the organic crystal nucleus agent in an amount of from 0.01 to 5 parts by weight based on 100 parts by weight of the polylactic acid resin.

3. The method of manufacturing a polylactic acid resin injection molded article according to claim 1 or 2, wherein the polylactic acid resin composition further comprises a plasticizer.

4. The method of manufacturing a polylactic acid resin injection molded article according to claim 1, wherein the supercritical fluid is contacted with the polylactic acid resin composition in a proportion of from 0.1 to 10% by weight of the polylactic acid resin composition.

5. The method of manufacturing a polylactic acid resin injection molded article according to claim 1, wherein the die temperature in the step (2) is from 10 to 90° C.

* * * * *